(12) United States Patent
Sakai et al.

(10) Patent No.: US 9,513,434 B2
(45) Date of Patent: Dec. 6, 2016

(54) OPTICAL WAVEGUIDE AND MANUFACTURING METHOD THEREOF

(71) Applicant: HITACHI CHEMICAL COMPANY, LTD., Tokyo (JP)

(72) Inventors: Daichi Sakai, Ibaraki (JP); Toshihiro Kuroda, Ibaraki (JP); Hiroshi Betsui, Ibaraki (JP); Kouta Segawa, Ibaraki (JP); Masao Uchigasaki, Ibaraki (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 127 days.

(21) Appl. No.: 14/371,591

(22) PCT Filed: Dec. 28, 2012

(86) PCT No.: PCT/JP2012/084139
§ 371 (c)(1),
(2) Date: Jul. 10, 2014

(87) PCT Pub. No.: WO2013/105471
PCT Pub. Date: Jul. 18, 2013

(65) Prior Publication Data
US 2015/0016773 A1   Jan. 15, 2015

(30) Foreign Application Priority Data

Jan. 11, 2012 (JP) ................. 2012-003587
Jan. 11, 2012 (JP) ................. 2012-003589
Jan. 11, 2012 (JP) ................. 2012-003590
Jan. 11, 2012 (JP) ................. 2012-003592

(51) Int. Cl.
*G02B 6/136* (2006.01)
*G02B 6/036* (2006.01)
(Continued)

(52) U.S. Cl.
CPC ............... *G02B 6/036* (2013.01); *G02B 6/122* (2013.01); *G02B 6/13* (2013.01); *G02B 6/136* (2013.01); *G02B 6/43* (2013.01); *G02B 2006/12166* (2013.01)

(58) Field of Classification Search
None
See application file for complete search history.

(56) References Cited

U.S. PATENT DOCUMENTS 6,078,707 A    6/2000  Yamamoto et al.
6,236,786 B1   5/2001  Aoki et al.
(Continued)

FOREIGN PATENT DOCUMENTS

JP    H11-248956 A    9/1999
JP    2000-298216 A   10/2000
(Continued)

OTHER PUBLICATIONS

Office Action of Japan Appln. No. 2012-003587 dated Dec. 15, 2015.
(Continued)

*Primary Examiner* — Tina Wong
(74) *Attorney, Agent, or Firm* — Fitch, Even, Tabin & Flannery, LLP

(57) ABSTRACT

The optical waveguide includes: a lower clad layer, a core layer, an upper clad layer, a substrate, and a mirror, the lower clad layer, the core layer, and the upper clad layer being sequentially laminated to the substrate, the mirror being formed on the core layer, in which the substrate has an opening, the maximum diameter of the opening is larger than that of luminous flux reflected by the mirror, and the maximum diameter of the opening is 240 μm or less. The optical waveguide is capable of transmitting a light signal regardless of the type of the substrate, suppressing the spread of a light signal reflected from the mirror, and transmitting a light signal with a low optical transmission loss.

22 Claims, 9 Drawing Sheets

(51) Int. Cl.
*G02B 6/122* (2006.01)
*G02B 6/43* (2006.01)
*G02B 6/13* (2006.01)
*G02B 6/12* (2006.01)

(56) References Cited

U.S. PATENT DOCUMENTS

| | | | |
|---|---|---|---|
| 6,804,423 B2* | 10/2004 | Tsukamoto | G02B 6/138 |
| | | | 385/14 |
| 7,519,244 B2* | 4/2009 | Hsu | G02B 6/43 |
| | | | 372/36 |
| 8,437,584 B2* | 5/2013 | Matsuoka | G02B 6/43 |
| | | | 385/14 |
| 2002/0118907 A1 | 8/2002 | Sugama | |
| 2005/0111781 A1 | 5/2005 | Jain et al. | |
| 2007/0237470 A1 | 10/2007 | Aronson et al. | |
| 2009/0274432 A1 | 11/2009 | Iwaya | |
| 2011/0243499 A1 | 10/2011 | Fujiwara | |
| 2015/0016773 A1* | 1/2015 | Sakai | G02B 6/122 |
| | | | 385/14 |

FOREIGN PATENT DOCUMENTS

| | | |
|---|---|---|
| JP | 2002-107560 A | 4/2002 |
| JP | 2005-70142 A | 3/2005 |
| JP | 2005-266119 A | 9/2005 |
| JP | 2006-11210 A | 1/2006 |
| JP | 2006-120956 A | 5/2006 |
| JP | 2006-351718 A | 12/2006 |
| JP | 2007-293308 A | 11/2007 |
| JP | 2009-288341 A | 12/2009 |
| JP | 2010-85438 A | 4/2010 |
| WO | 01/01176 A1 | 1/2001 |
| WO | 2007/105419 A1 | 9/2007 |

OTHER PUBLICATIONS

Office Action of JP Appln. No. 2012-003589 dated Dec. 15, 2015.
Office Action of counterpart TW Appln. No. 101151032 dated Jun. 17, 2016.

* cited by examiner

OPTICAL WAVEGUIDE AND MANUFACTURING METHOD THEREOF

TECHNICAL FIELD

The present invention relates to an optical waveguide and a method of producing the same. Particularly, the present invention relates to an optical waveguide with a mirror and a method of producing the same.

BACKGROUND ART

As information capacity increases, in not only the communication field including a trunk line and an access system but also information processing in a router and a server, the optical interconnection technology using an optical signal has been developed. Particularly, to use light for short distance signal transmission between or in boards in a router and a server device, an optical waveguide, which has a higher flexibility of wiring and can more highly densify wiring compared with an optical fiber, is desirably used as an optical transmission channel. More particularly, an optical waveguide formed by using a polymer material with excellent processability and economic efficiency shows promise.

Such an optical waveguide is formed by, for example, curing and forming a lower clad layer, forming a core pattern on the lower clad layer, and then laminating an upper clad layer to the core pattern as described in Patent Document 1. Then, an optical waveguide in which a mirror is formed on the laminated body by cutting is proposed.

In such an optical waveguide, a light signal with an optical path changed by the mirror passes through the substrate, and thus the substrate should be a material with a high transmissivity to a light signal. Furthermore, when a space exists between the substrate and an optical device, the spot diameter of a light signal with an optical path changed by the mirror increases, causing the optical transmission loss to deteriorate.

As an optical waveguide with a less space between the substrate and an optical device, for example, an optical waveguide with a mirror in which an opening hole is provided on the core or at the ends of the core and in which a component for changing an optical path is inserted to the opening hole is proposed as described in Patent Document 2.

However, the work to produce such an optical wave guide is complicated because the component for changing an optical path is required to be inserted in each optical path changing part of the optical waveguide. Moreover, highly accurate alignment is necessary because the alignment is required in the planar direction and the vertical direction of the substrate.

PRIOR ART DOCUMENTS

Patent Documents

Patent Document 1: JP-A-2006-011210
Patent Document 2: JP-A-2005-70142

SUMMARY OF THE INVENTION

Problems to be Solved by the Invention

The present invention is achieved to solve the above-mentioned problems. The objective of the present invention is to provide an optical waveguide capable of transmitting a light signal regardless of the type of the substrate, suppressing the spread of a light signal reflected from the mirror, and transmitting a light signal with a low optical transmission loss and a method of producing the same.

Means for Solving the Problems

As a result of their extensive studies to solve the above-mentioned problems, the inventors found that the above-mentioned problems can be solved by an optical waveguide including a lower clad layer, a core layer, an upper clad layer, a substrate, and a mirror, the lower clad layer, the core layer, and the upper clad layer being sequentially laminated to the substrate, the mirror being formed on the core layer, in which the substrate has a specific size of opening. The present invention was completed based on this finding.

According to the present invention, (1) An optical waveguide includes a lower clad layer, a core layer, an upper clad layer, a substrate, and a mirror, the lower clad layer, the core layer, and the upper clad layer being sequentially laminated to the substrate, the mirror being formed on the core layer, in which the substrate has a specific size of opening, the maximum diameter of the opening is larger than that of luminous flux reflected by the mirror, and the maximum diameter of the opening is 240 µm or less.

(2) The optical waveguide according to (1) further includes a pillar-shaped transparent member projecting from the opening to the back surface direction of the substrate.

(3) The optical waveguide according to (2) further includes a reinforcing plate connected with at least a part of the sidewall of the pillar-shaped transparent member.

(4) The optical waveguide according to (1) further includes a transparent resin layer A formed of a transparent resin a between the substrate and the lower clad layer, in which the opening is filled with the transparent resin a.

(5) The optical waveguide according to (1) further includes a transparent resin layer B formed of a transparent resin b on the surface opposite to the lower clad layer formed surface of the substrate, in which the opening is filled with a resin composition forming the lower clad layer and the transparent resin b.

(6) A method of producing an optical waveguide according to (2) includes: a step (A) of laminating a transparent resin layer A formed of a transparent resin a to one surface of a substrate having an opening and filling at least a part of the opening on the substrate with a transparent resin a while laminating a transparent resin layer B formed of a transparent resin b to the other surface of the substrate; and a step (B) of exposing the opening from the transparent resin layer A formed surface side to light-cure the transparent resin b on and in the opening.

(7) A method of producing an optical waveguide according to (3) includes: a step (S) of forming a reinforcing plate around the opening on the back surface of the substrate; a step (A) of laminating a transparent resin layer A formed of a transparent resin a to the surface of the substrate and laminating a transparent resin layer B formed of a transparent resin b to the back surface of the substrate; and a step (B) of exposing the opening from the transparent resin layer A formed surface side to light-cure the transparent resin b n and in the opening.

(8) A method of producing an optical waveguide according to (2) includes: a step (A) of forming a lower clad layer on one surface of the substrate so that the state in which at least a part of an opening on a substrate is opened on the substrate is maintained and then laminating a resin composition for forming a core layer to the lower clad layer and filling at least a part of the opening on the substrate with a resin composition for forming a core layer while laminating a transparent resin b to the other surface of the substrate; a step (B) of exposing the opening from the core layer side to light-cure the transparent resin b in and on the opening; a step (C) of developing and removing the uncured part of the transparent resin b to form a pillar-shaped transparent member; a step ($D_3$) of forming an upper clad layer on the core layer; and a step (E) of forming a mirror on the core layer.

(9) A method of producing an optical waveguide according to (3) includes: a step (S) of forming a reinforcing plate around the opening on the back surface of the substrate; a step (A) of forming a lower clad layer on the surface of the substrate so that the state in which at least a part of an opening on a substrate is opened is maintained and then laminating a resin composition for forming a core layer to the lower clad layer and filling at least a part of the opening on the substrate with a resin composition for forming a core layer while laminating a transparent resin b to the back surface of the substrate; a step (B) of exposing the opening from the core layer side to light-cure the transparent resin b in and on the opening; a step (C) of developing and removing the uncured part of the transparent resin b to form a pillar-shaped transparent member; a step ($D_3$) of forming an upper clad layer on the core layer; and a step (E) of forming a mirror on the core layer.

(10) A method of producing an optical waveguide according to (2) or (5) includes a step (A) of forming a transparent resin layers A and B by using a transparent resin on the both surfaces of the substrate having at least one opening and filling the opening with the transparent resin; a step (B) of curing at least a part of the transparent resin in the opening; a step (D) of forming an optical waveguide including a clad layer and a core layer on the surface of at least one of the transparent resin layers A and B; and a step (E) of forming a mirror on the core layer.

(11) A method of producing an optical waveguide according to (4) includes a step (A') of providing a release layer on one surface of the substrate having at least one opening while forming a transparent resin layer formed of a transparent resin on the other surface and filling the opening with a transparent resin; a step (A") of removing the release layer after the opening is filled with a transparent resin; a step (D) of forming an optical waveguide including a clad layer and a core layer on the substrate; and a step (E) of forming a mirror on the core layer immediately above the opening.

Advantages of the Invention

The optical waveguide of the present invention is capable of transmitting a light signal regardless of the type of the substrate, suppressing the spread of a light signal reflected from the mirror, and transmitting a light signal with a low optical transmission loss. Moreover, according to the method of the present invention, the optical waveguide of the present invention can be efficiently produced with excellent features.

DESCRIPTION OF THE SYMBOLS

Figure 1:
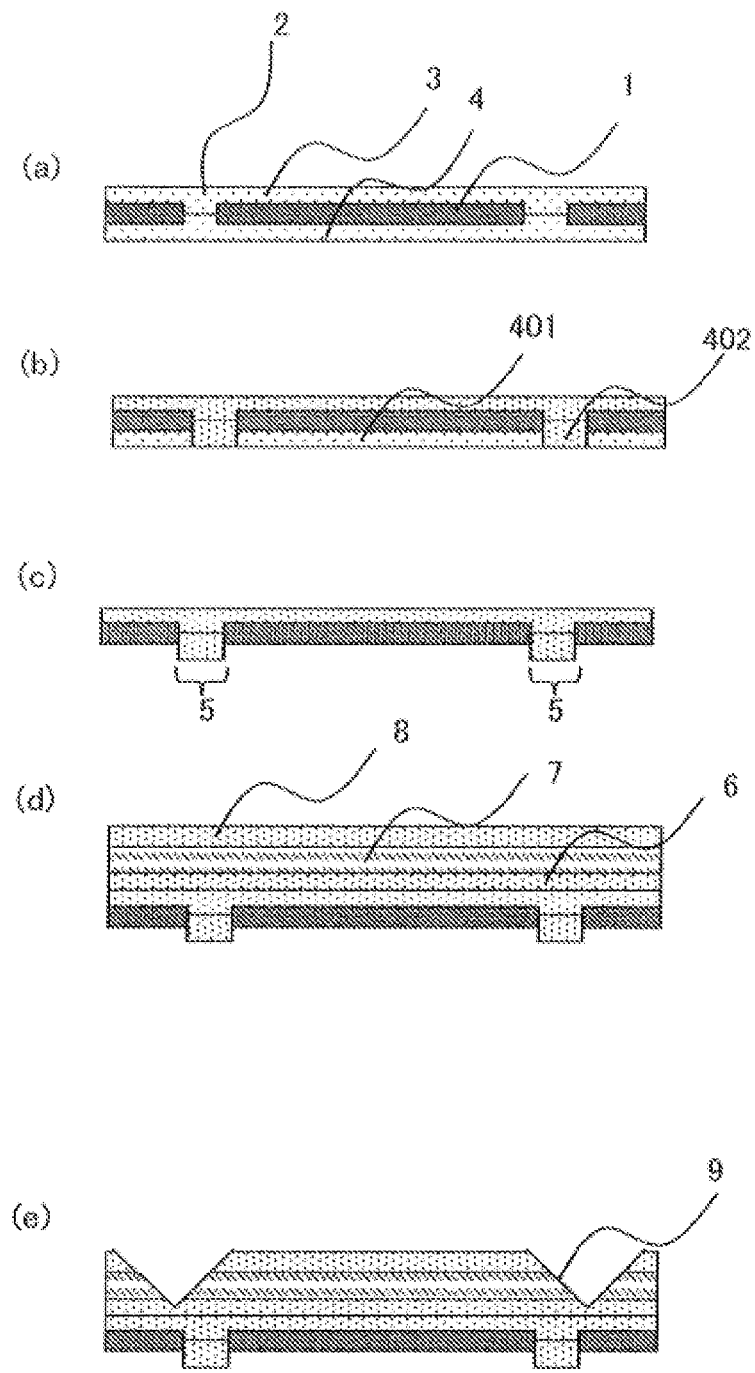
FIGS. 1(a) to 1(e) show a diagram illustrating one example of the method of producing an optical waveguide according to the present invention.

1 Substrate
2 Opening
3 Transparent resin layer A
4 Transparent resin layer B
401 Uncured part of transparent resin
402 Cured part of transparent resin
5 Pillar-shaped transparent member (Transparent resin part material)
6 Lower clad layer
7 Core layer
8 Upper clad layer
9 Mirror
10 Electrical wiring
11 Protective layer for electrical wiring
12 Reinforcing plate (Metal layer)
13 Reinforcing plate (A part of substrate)
14 Release layer Embodiments for Carrying Out the Invention The optical waveguide of the present invention includes a lower clad layer 6, a core layer 7, an upper clad layer 8, a substrate 1, and a mirror 9, the lower clad layer, the core layer, and the upper clad layer being sequentially laminated to the substrate, the mirror 9 being formed on the core layer, in which the substrate 1 has an opening 2, the maximum diameter of the opening 2 is larger than that of luminous flux reflected by the mirror, and the maximum diameter of the opening 2 is 240 μm or less.

The structure in which a substrate is provided with an opening to allow a light signal to pass through the opening enables a light signal to transmit between above and below the substrate. Increasing the maximum diameter of the opening 2 more than that of luminous flux reflected by the mirror prevents the substrate around the opening from interfering in a light signal with an optical path changed from the core pattern to the vertical direction of the substrate by the mirror or a light signal with an optical path changed from the vertical direction of the substrate to the core pattern by the mirror, not causing optical transmission loss when the light signal pass through the opening.

The maximum diameter of the opening 2 of 240 μm or less can secure the strength of the substrate and maintain the shape of the opening even in an optical waveguide with a narrow pitch of about 250 μm.

The maximum diameter of luminous flux reflected by the mirror means the diagonal line when luminous flux has a rectangle shape, the diameter when luminous flux has a circle shape, and the major axis when luminous flux has an oval shape.

A preferable embodiment of the optical waveguide of the present invention including a lower clad layer 6, a core layer 7, an upper clad layer 8, a substrate 1, and a mirror 9, the lower clad layer, the core layer, and the upper clad layer being sequentially laminated to the substrate, the mirror 9 being formed on the core layer, in which the substrate 1 has an opening 2 further includes a pillar-shaped transparent member projecting from the opening 2 to the back surface direction of the substrate 5 (hereinafter referred to as "first embodiment").

The first embodiment has various aspects as the specific aspects. For example, in the aspect shown in FIG. 1(e), the optical waveguide preferably has openings 2 on at least a part of the substrate 1, a transparent resin layer 3 formed of a transparent resin a, a lower clad layer 6, a core layer 7, and an upper clad layer 8 which are sequentially formed on one surface of the substrate 1, and a mirror 9 on the core layer 7 immediately above each opening 2 in the direction perpendicular to the surface of the substrate 1. At least a part of each opening 2 on the substrate 1 is filled with a transparent resin a. A pillar-shaped transparent member 5 formed of the transparent resin b is in contact with the transparent resin a in the opening and projects to the back surface direction of the substrate 1.

The part "immediately above the opening 2" shows the positional and dimensional relationship between the size and the position of the opening and the mirror not to produce a negative effect caused by interfering in a light signal with an optical path changed by the mirror so as not to cause optical transmission loss when the light signal pass through the opening as described above.

In the present invention, the surface of the substrate means the surface of the substrate on which the optical waveguide is formed while the back surface means the surface opposite to the surface on which the optical waveguide is formed.

Figure 2:
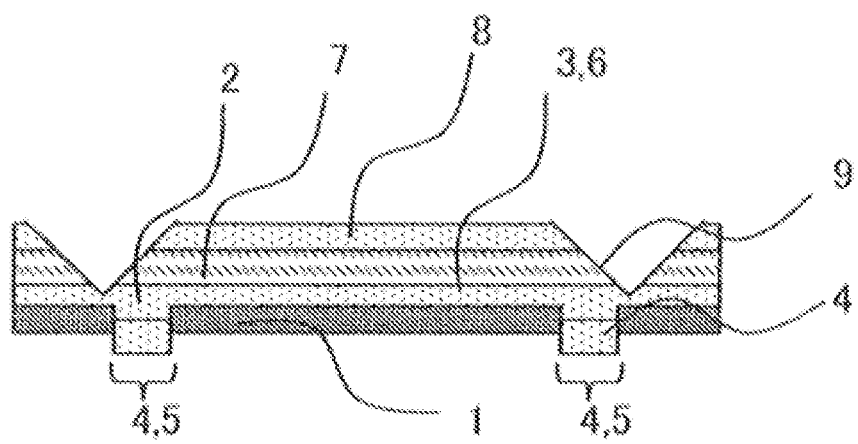
FIG. 2 shows the diagram illustrating one example of the optical waveguide of the present invention.
Figure 3:
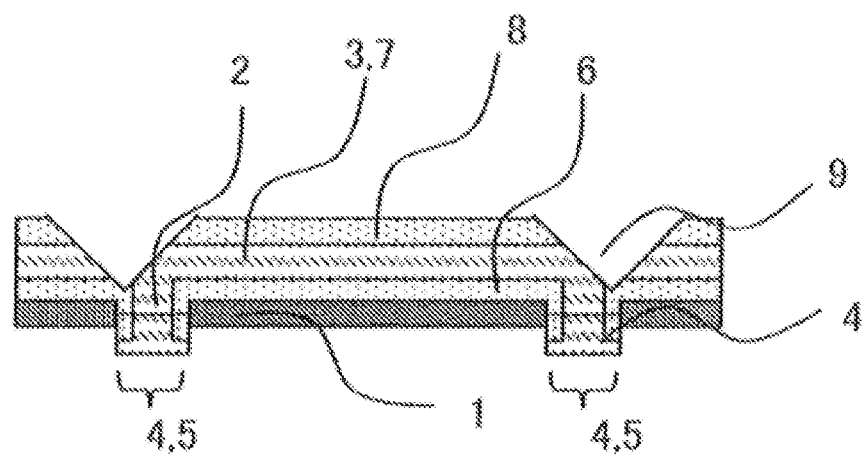
FIG. 3 shows the diagram illustrating one of other examples of the optical waveguide of the present invention.
Figure 4:
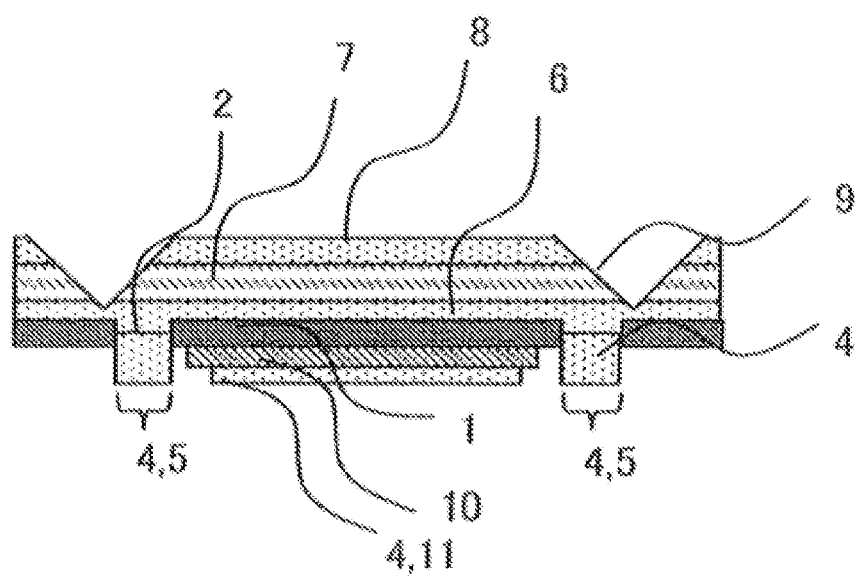
FIG. 4 shows the diagram illustrating one of other examples of the optical waveguide of the present invention.

As another aspect, in the optical waveguide in FIG. 1(e), the transparent resin layer 3 formed of a transparent resin a and the lower clad layer 6 are combined as shown in FIG. 2. As yet another aspect, in the optical waveguide, a resin composition for forming a lower clad layer is provided around the openings 2, the lower clad layer 6 is formed to maintain the open state of the openings 2, a resin composition for forming a core layer is laminated, and then the openings 2 are filled with a resin composition for forming a core layer, as shown in FIG. 3. In this case, a pillar-shaped transparent member 5 formed of the transparent resin b is in contact with a resin component for forming a core layer and project from the back surface of the substrate 1. In this aspect, the transparent resin layer 3 and the core layer 7 are combined. As yet still further aspect, the optical waveguide may have an electrical wiring board provided with electrical wiring, in which the transparent resin layer B can be used as a protective layer for electrical wiring, as shown in FIG. 4. In this aspect, the transparent resin layers 4 formed of the transparent resin b and the protective layer for electrical wiring 11 are combined.

In the process of forming a pillar-shaped transparent member 5 in the present invention, a transparent resin layer B is formed on the back surface of the substrate 1 by using a photo-curable transparent resin b, exposed from the core layer formed surface side (the surface of the substrate) by using the substrate 1 substituted for the light shielding part, developed, and patterned to obtain a pillar-shaped transparent member 5. Accordingly, the process can provide a pillar-shaped transparent member 5 having the approximately same shape as that of the opening 2 and projecting from the back surface of the substrate 1. Thus, the transparent resin layer 4 does not exist on the back surface of the substrate from which the pillar-shaped transparent member 5 projects, so that space can be efficiently secured on electrical wiring and the implementation of devices. In addition, since a light signal transmits through the opening 2 on which the pillar-shaped transparent member 5 is formed, excellent optical communication can be advantageously conducted regardless of the type of the substrate 1 (the light signal transmission).

When having a high transparency, the substrate 1 typically has a higher refractive index than the transparent resin a, the transparent resin b, the lower clad layer, and the core layer. Thus, Fresnel loss is caused by the refractive index difference between air and the substrate when a light signal transmits through the substrate. On the other hand, in the optical waveguide of the present invention, light transmits through a pillar-shaped transparent resin member which has a lower refractive index than the substrate 1 so as to decrease the Fresnel loss.

Furthermore, since the pillar-shaped transparent member 5 can reduce the space gap between an optical device and the optical waveguide that are mounted on the substrate 1, the spread of a light signal reflected from the mirror can be suppressed to allow a light signal to transmit with a low optical transmission loss.

The transparent resin a forming the transparent resin layer 3 and the transparent resin b forming a pillar-shaped transparent member may be or may not be the same. These transparent resins are preferably the same to obtain a high adhesiveness between the transparent resin a and the transparent resin b. Particularly, this is advantageous when the small pillar-shaped transparent member 5 is formed.

Moreover, a film transparent resin b is more preferably used because the height of the projection of the pillar-shaped transparent member 5 from the back surface of the substrate 1 can be controlled.

Substrate

The material of the substrate 1 used for the optical waveguide of the present invention is not particularly limited. Examples of the material include a glass epoxy resin substrate, a ceramic substrate, a glass substrate, a silicon substrate, a plastic substrate, a metal substrate, a substrate having a resin layer, a substrate having a metal layer, a plastic film, a plastic film having a resin layer, a plastic film having a metal layer, an electrical wiring board. Particularly, the material preferably has a light shielding effect on active light for light-curing the transparent resin b.

When the active light for light-curing the transparent resin b are ultraviolet rays, examples of the material preferably include a metal substrate, and a plastic substrate and a glass epoxy resin substrate through which ultraviolet rays can not transmit. When the transparent resin a or a substrate with a low adhesivity to the lower clad layer is used, a substrate with an adhesive layer may be used. This adhesive layer only has to be provided on the substrate so as not to cover the opening.

The thickness of the substrate is not limited in particular as long as the opening is filled with the transparent resin a (including the case in which the transparent resin a is combined with the lower clad layer or the core layer) and the transparent resin b. A thinner substrate is preferable because a light receiving device, an optical fiber, and the like can receive light before a light signal reflected by the mirror spreads. From these viewpoints, the thickness of the substrate is preferably 5 μm to 1 mm. From the viewpoint of the working efficiency, the thickness of the substrate is more preferably 10 μm to 100 μm.

Opening

As the opening 2, a hole only has to be created in the substrate 1. For example, the opening can be preferably formed by using a drill and a laser beam. The opening may be a through hole with a metal layer which is formed on the side surface of the opening by depositing, spattering, plating, and the like of various metals.

The shape of the opening 2 is not limited in particular as long as being circle, oval, multiangular, or the like. The sidewall of the opening may have a vertically formed pillar-shape or a tapered quadrangular pyramid.

The size of the opening only has to fall within the range of no influence on optical transmission loss. When the mirror is viewed from the surface of the substrate side, the mirror preferably has a size to fit in the opening. Specifically, when the size of the mirror is 50 μm×50 μm and when the opening has a circle shape, the opening preferably has a diameter of 502 μm or more so that the mirror is inscribed to the opening.

Pillar-Shaped Transparent Member

The pillar-shaped transparent member 5 can be obtained by patterning the opening 2 formed on the substrate 1 as a light shielding mask as described above. As shown in FIG. 3, the pillar-shaped transparent member 5 may be formed of two or more kinds of transparent materials.

As the material forming the pillar-shaped transparent member, examples of the transparent resin b as described later are preferable. The height of the pillar-shaped transparent member 5 projecting from the back surface of the substrate 1 is not limited in particular. The height can be appropriately adjusted by the thickness of the transparent resin layer 4 formed on the back side of the substrate 1. From the viewpoint of filling the gap between various optical devices and the surface of the substrate, the height is preferably less than the gap between each light emitting and receiving surface of various light emitting and receiving devices to be used and the surface of the substrate.

Transparent Resin a

The transparent resin a is not limited in particular as long as being transparent to the light signal to be used. The resins for forming a clad layer and the resins for forming a core layer as describe later can be used. The transparent resin a is in a liquid state or a film form. The transparent resin a is preferably in a film form to control the film thickness.

The transparent resin layer 3 formed of the transparent resin a may be combined with the lower clad layer 6 or the core layer 7. When the transparent resin layer 3 is combined with the lower clad layer 6, the lower clad layer 6 only has to have adhesivity to the substrate 1. When the transparent resin layer 3 is combined with the core layer 7, the lower clad layer 6 is patterned, a part of each opening 2 is maintained to be opened, and then the core layer 7 is formed.

Transparent Resin b

The transparent resin b is transparent to the light signal to be used and is preferably capable of forming a pattern by using active light. The transparent resin b is in a liquid state or a film form. The transparent resin b is preferably in a film form to control the film thickness.

As long as being capable of patterning, a resin composition and a film for forming a lower clad layer 6 and a core layer 7 may be used.

The same material as the transparent resin a is more preferably used because the adhesivity increases to prevent the layer formed of the transparent resin b from peeling off in the following development or the like.

Lower Clad Layer and Upper Clad Layer

As the lower clad layer 6 and the upper clad layer 8 used in the present invention, a resin composition for forming a clad layer or a resin film for forming a clad layer can be used.

The resin composition for forming a clad layer used in the present invention is not limited in particular as long as being a photosensitive or thermosetting resin composition which has a lower refractive index than the core layer 7. For the resin composition for forming a clad layer, a thermosetting resin composition and a photosensitive resin composition can be preferably used. The components of the resin composition used for the resin for forming a clad layer in the lower clad layer 6 may be the same as or different from those in the upper clad layer 8. The refractive index of the resin composition in the lower clad layer 6 may be the same as or different from that in the upper clad layer 8.

When used as the transparent resin b, the resin composition for forming a clad layer composition is a photosensitive composition. It is important that a resin composition can form a pattern by using active light.

In the present invention, the process of forming a clad layer is not limited in particular. The clad layer only has to be formed by, for example, applying a resin composition for forming a clad layer or laminating a resin film for forming a clad layer.

The process of forming a clad layer by application is not limited in particular. A resin composition for forming a clad layer only has to be applied by a conventional method.

The resin film for forming a clad layer to be used in lamination can be easily produced by, for example, dissolving a resin composition for forming a clad layer in a solvent, applying the dissolved resin composition to a carrier film, and then removing the solvent.

The thicknesses of the lower clad layer 6 and the upper clad layer 8 are not limited in particular but preferably fall within the range of 5 to 500 μm after dried. The thickness of 5 μm or more can secure the clad thickness necessary for the confinement of light. The thickness of 500 μm or less easily controls the film thickness to be uniform. From these viewpoints, the thickness of the lower clad layer 6 and the upper clad layer 8 more preferably falls within the range of 10 to 100 μm.

Core Layer

As the core layer 7, a resin for forming a core layer or a resin film for forming a core layer can be used.

The resin for forming a core layer is designed to have a higher refractive index than the clad layers 6 and 8. For the resin for forming a core layer, a resin capable of forming the core pattern by using active light is preferably used. The process of forming a core layer before patterning is not limited, including a process of applying the resin composition for forming a core layer by a conventional method.

The thickness of the resin film for forming a core layer is not limited in particular but typically adjusted so that the thickness of the core layer after drying is adjusted to 10 to 100 μm. The film with a thickness of 10 μm or more after the core layer 7 is formed has an advantage that the alignment tolerance can further be expanded in the bond with a light receiving and emitting device or an optical fiber after the optical waveguide is formed. The film with a thickness of 100 μm or less has an advantage that the binding efficiency is improved in the bond with a light receiving and emitting device or an optical fiber after the optical waveguide is formed. From these viewpoints, the thickness of the film preferably falls within the range of 30 to 90 μm. To obtain the thickness, the film thickness only has to be appropriately adjusted.

Mirror

As long as having the structure to change the optical path after a light signal transmits through the core layer placed in parallel with the substrate plane to the vertical direction of the substrate, the mirror is not limited in particular. The mirror may be an air reflection mirror formed from a notch inclined by 45° or may be a metal reflection mirror with a specular metal layer formed on the notch.

Electrical Wiring

When various optical devices are implemented on the surface opposite to the core formed surface (back surface of the substrate), electrical wiring 10 may be provided on the surface opposite to the core formed surface of the substrate.

Protective Layer for Electrical Wiring

As long as being transparent to the light signal to be used, capable of forming a pattern by using active light, and usable as the protective layer for electrical wiring 11, the transparent resin b can be used as the protective layer for electrical wiring 11 to protect the above-mentioned electrical wiring 10 (see to FIG. 4). The protective layer for electrical wiring 11 is preferably patterned separately from the pillar-shaped transparent member 5 from the viewpoint of the alignment accuracy of the protective layer for electrical wiring 11 with the electrical wiring 10. When the substrate 1 is a light shielding substrate, the protective layer for electrical wiring 11 cannot be patterned by exposure from the optical waveguide formed surface side (surface of the substrate). Thus, the exposure should be conducted from the surface opposite to the optical waveguide formed surface of the substrate (back surface of the substrate) in a different process.

The method of producing the optical waveguide according to the first embodiment of the present invention will be explained below.

Step (A)

The step (A) is to laminate a transparent resin a to one surface of a substrate having an opening and filling at least a part of the opening on the substrate with a transparent resin a while laminating a transparent resin b to the other surface of the substrate.

The process of laminating the transparent resin a and the transparent resin b to the substrate 1 is not limited in particular. When being in a liquid state, the transparent resin a and the transparent resin b only have to be applied to the substrate 1 by a conventional method. When the transparent resin a and the transparent resin b are in a film form, various means such as a roll laminator, a vacuum pressure laminator, a press, and a vacuum press only have to be used. The order of lamination is not limited in particular. Thus, (a) the transparent resin b may be laminated to the back surface of the substrate 1 to form the transparent resin layer 4 after the transparent resin a is laminated to the surface of the substrate 1 to form the transparent resin layer 3. (b) The transparent resin a may be laminated to the surface of the substrate 1 to form the transparent resin layer 3 after the transparent resin b is laminated to the back surface of the substrate 1 to form the transparent resin layer 4. (c) The transparent resin a and the transparent resin b may be laminated at the same time to form the transparent resin layer 3 and the transparent resin layer 4, respectively.

In the case (a), the boundary of the transparent resin layer 3 and the transparent resin layer 4 is near the back surface of the substrate 1 on which the transparent resin layer 4 is formed. In the case (b), the boundary of the transparent resin layer 3 and the transparent resin layer 4 is near the surface of the substrate 1 on which the transparent resin layer 3 is formed. In the case (c), the boundary of the transparent resin layer 3 and the transparent resin layer 4 is near the center of the opening 2 in the thickness direction of the substrate 1. The case (c) is particularly preferable because the flatness of the respective resin surfaces of the transparent resin layer 3 and the transparent resin layer 4 is easily secured.

In the method of the present invention, since the opening 2 is filled with the transparent resin to connect the transparent resin layer 3 with the transparent resin layer 4 in the openings 2 in the step (A), the adhesive strength of the substrate and the transparent resin layer can be highly maintained. The transparent resin layer is not peeled off in the following patterning process (including development). Even if provided on the opening 2, downsized pillar-shaped transparent members 5 as shown in FIG. 1(*c*) to (*e*) are strength enough to be formed without being peeled off in the following patterning process (including development).

Step (B)

The step (B) is to light-cure the transparent resin b.

As the process of light-curing the transparent resin b, the transparent resin b only has to be exposed from the transparent resin layer 3 side. The cured part of transparent resin 402 with an outline formed from an opening 2 and the uncured part of transparent resin 401 on the substrate 1 can be formed by using the substrate 1 as the light shielding part. This step (B) is conducted after the transparent resin b is laminated in the above-mentioned step (A) but may be followed by the lamination of the transparent resin a.

Step (C)

The step (C) is to develop and remove the uncured part of the transparent resin b to form a pillar-shaped transparent member 5.

In the process of patterning the transparent resin b to form a pillar-shaped transparent member 5, the uncured part of the transparent resin 401 only has to be removed by etching. For etching, a developer capable of removing the uncured part of the transparent resin 401 only has to be used.

Step (D)

The step (D) is to form an optical waveguide.

The step ($D_1$) after the transparent resin layer 3 is formed only has to sequentially form a lower clad layer 6, a core layer 7, and an upper clad layer 8 on the transparent resin layer 3. The process of forming each of these layers is not limited in particular. A liquid resin composition for forming a clad layer or a liquid resin composition for forming a core layer may be applied by spin coating or the like. A film resin composition for forming a clad layer or a film resin composition for forming a core layer may be laminated by using a means such as a roll laminator, a vacuum laminator, a press, and a vacuum press.

When the transparent resin layer 3 and the lower clad layer 6 are combined, the core layer 7 and the upper clad layer 8 only have to be sequentially formed by using the above-mentioned process in the step ($D_2$) after the transparent resin layer 3 (lower clad layer 6) is formed, in the same way as the step ($D_1$).

When the transparent resin layer 3 and the lower clad layer 7 are combined, the upper clad layer 8 only has to be formed by using the above-mentioned process in the step (D₃) after the transparent resin layer 3 (core layer 7) is formed, in the same way as the step (D₁).

Step (E)

The step (E) is to form a mirror on the core layer.

As the process of forming a mirror 9, a well-known method can be applied. For example, the mirror can be formed by cutting the core layer 7 with a dicing saw or the like from the core layer 7 formed surface side. The mirror 9 to be formed has a degree of 45°.

Metal such as gold may be deposited on the mirror with a deposition device to form a mirror provided with a specular metal layer. This step (E) may be conducted after a core layer is laminated during the above-mentioned step (D).

Step (F)

The step (F) is to forma protective layer for electrical wiring for protecting wiring.

When the transparent resin b is a photosensitive resin composition for protecting electrical wiring and when electrical wiring 10 is provided on the back surface of the substrate on which the transparent resin layer 4 is formed, the surface on which the transparent resin layer 4 and electrical wiring are formed (back surface of the substrate) are pattern-exposed after the step (A) or the step (B) so as to form a protective layer for electrical wiring 11 from the cured part 402 of the transparent resin b.

The protective layer for electrical wiring 11 can be formed at the same time when the uncured part 401 of the transparent resin b is removed by etching to form a pillar-shaped transparent member 5 in the following step (C).

An embodiment of the optical waveguide of the present invention preferably further has a reinforcement board 12 in addition to the above-mentioned first embodiment. Specifically, the optical waveguide of the present invention including a lower clad layer 6, a core layer 7, an upper clad layer 8, a substrate 1, and a mirror 9, the lower clad layer, the core layer, and the upper clad layer being sequentially laminated to the substrate 1, the mirror 9 being formed on the core layer, in which the substrate 1 has an opening 2 and further including a pillar-shaped transparent member 5 projecting from the opening 2 to the back surface direction of the substrate further includes a reinforcing plate 12 connected with at least a part of the sidewall of the pillar-shaped transparent member (hereinafter referred to as "second embodiment").

The second embodiment has various aspects. For example, in the aspect shown in FIG. 5(e), the optical waveguide has openings 2 on at least a part of the substrate 1, a transparent resin layer 3 formed of a transparent resin a, a lower Clad layer 6, a core layer 7, and an upper clad layer 8 which are sequentially formed on one surface of the substrate 1, and a mirror 9 on the core layer 7 immediately above each openings 2 in the direction perpendicular to the surface of substrate 1. At least a part of each opening 2 on the substrate 1 is filled with a transparent resin a. A pillar-shaped transparent member 5 formed of the transparent resin b is in contact with the transparent resin a in the opening and projects to the back surface direction of the substrate 1. The optical waveguide further has reinforcing plates 12 each connected with at least apart of the sidewall of the pillar-shaped transparent member 5.

In the process of forming a pillar-shaped transparent member 5 in the second embodiment, an opening 2 and a reinforcing plate 12 are formed in contact with each other, a transparent resin layer is formed on the back surface of the substrate 1 by using a photo-curable transparent resin b, exposed from the core layer formed surface side (the surface of the substrate) by using the substrate 1 substituted for the shading part, developed, and patterned to obtain a pillar-shaped transparent member 5. Accordingly, the process can provide a pillar-shaped transparent member 5 having the approximately same shape as that of the opening 2 and projecting from the back surface of the substrate 1, in which the reinforcing plate is connected with at least a part of the side wall of the pillar-shaped transparent member. This can prevent the pillar-shaped transparent member 5 from projecting beyond the thickness (height) of the reinforcing plate 12 and reinforce the pillar-shaped transparent member so as to suppress the damage and the transformation of the pillar-shaped transparent member 5 during the production process. In addition, since a light signal transmits through the opening 2 on which the pillar-shaped transparent member 5 is formed, excellent optical communication can be advantageously conducted regardless of the type of the substrate 1 (the light signal transmission).

Even when the substrate 1 has a high transparency, the Fresnel loss can be decreased in the same way as the first embodiment.

The reinforcing plate 12 to reinforce the pillar-shaped transparent member is preferably formed from a metal layer as described later in detail. This improves the reinforcement and promises the decreased optical transmission loss because at least the surface of the metal layer formed of metal with a high reflectivity has an effect to allow a light signal with an optical path changed from the mirror to the substrate planar direction to be reflected off the sidewall of the reinforcing plate and then to pass to a light receiving device.

Reinforcing Plate

The reinforcing plate 12 only has to be formed near the opening 2 on the transparent resin layer 4 formed surface side of the substrate 1 (back surface of the substrate 1) before the transparent resin layer 3 and the transparent resin layer 4 are formed. The reinforcing plate is formed from preferably a material which has a higher elastic modulus than the transparent resin b, more preferably a metal layer from the viewpoint of reinforcing the pillar-shaped transparent member 5.

As the type of the metal is not limited in particular, various metals such as Au, Ag, Cu, Cr, Al, Ni, and Pd are used. The material is more preferably a metal with a high reflectivity from the viewpoint of the decreased optical transmission loss because such a metal produces an effect to allow a light signal with an optical path changed from the mirror to the substrate planar direction to be reflected off the sidewall of the reinforcing plate and then to pass to a light receiving device. Thus, Au, Ag, Cu, and the like are suitable.

The reinforcing plate only has to be formed on at least a part of the circumference of the opening 2 on the transparent resin layer 4 formed surface side of the substrate 1 (back surface of the substrate 1). The reinforcing plate is more preferably placed to edge the opening 2. Moreover, the metal layer may be placed on the inner wall of the opening 2 so as to more strongly connect the reinforcing plate 12 with the substrate 1. Specifically, a metal layer is provided on the both sides of the substrate 1. The inner wall of the opening 2 is plated with Cu, Au, or the like to form a metal layer on the inner wall after the opening 2 is formed.

Moreover, the reinforcing plate 12 is preferably patterned. This is because forming a patterned reinforcing plate 12 can improve the embeddedness of the transparent resin b to the opening 2 and decrease the height of the projection part of the pillar-shaped transparent members 5 to less than the thickness of the reinforcing plate 12.

The thickness of the reinforcing plate is not limited in particular but preferably enough to embed the transparent resin b in the opening. From this viewpoint, the thickness is preferably 3 to 50 µm, more preferably 5 to 38 µm.

The method of producing the optical waveguide according to the second embodiment will be explained below. Except the step (S) of forming a reinforcing plate, the method of producing the second embodiment is the same as that of producing the first embodiment.

Step (S)

The step (S) is to form a reinforcing plate around the opening on the back surface of the substrate. In the process of forming a reinforcing plate is not limited in particular. In the process of patterning the reinforcing plate when metal is used for the reinforcing plate, the substrate 1 having a metal layer on the surface of the substrate (at least the transparent resin layer 4 formed surface, back surface of the substrate) is used, a pattern resist is formed on the metal layer, the metal layer is patterned by etching or the like, and the pattern resist is removed.

The process of forming the openings 2 may conducted in a step ($S_1$) of forming an opening by a hole process after the metal layer is patterned or a step ($S_2$) of patterning the metal layer after the metal layer (reinforcing plate) is subjected to a hole process.

Figure 9:
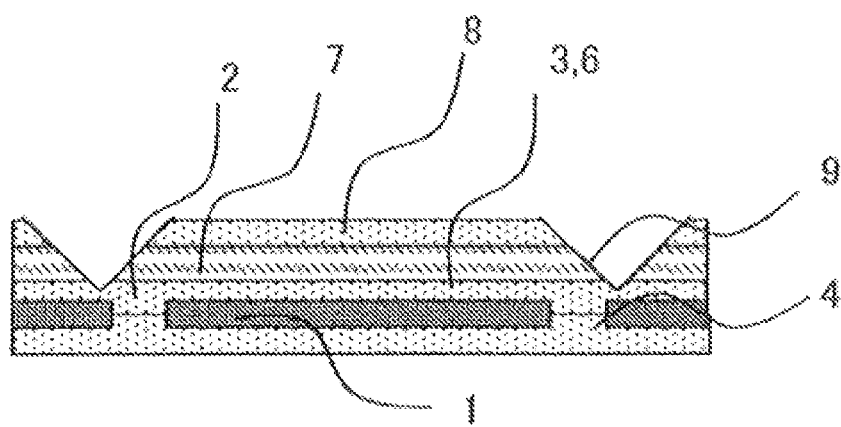
FIG. 9 shows the diagram illustrating one of other examples of the optical waveguide obtained by the production method of the present invention.

As the optical waveguide of the present invention, the embodiment with no pillar-shaped transparent members 5 in the first embodiment falls within the scope of the present invention. Specifically, as shown in FIG. 9, the transparent resin layer 4 cured on the surface of the substrate 1 is not patterned in contrast to FIGS. 5(a) to 5(e) (hereinafter referred to as "third embodiment").

In the optical waveguide according to the third embodiment as well as the first and second embodiments, since a light signal transmits through the opening 2, excellent optical communication can be advantageously conducted regardless of the type (light signal transmission) of the substrate 1. Even when the substrate 1 has a high transparency, the potential Fresnel loss can be decreased.

The method of producing the optical waveguide according to the third embodiment is composed of the following steps.

(A) A transparent resin layers A and B are formed by using a transparent resin on the both surfaces of the substrate having at least one opening and filling the opening with the transparent resin.

(B) At least a part of the transparent resin in the opening is cured.

(D) An optical waveguide including a clad layer and a core layer is formed on the surface of at least one of the transparent resin layers A and B.

(E) A mirror is formed on the core layer.

Each step will be explained below in detail in reference to FIGS. 1(a) to 1(e).

Step (A)

The step (A) is to form the transparent resin layer A (symbol 3 of FIG. 1(a)) and the transparent resin layer B (symbol 4 of FIG. 1(a)) on the both surface of the substrate 1 having at least one opening 2 by using a transparent resin and fill the opening 2 with the transparent resin as shown in FIG. 1(a). This is the same as the step (A) explained in the first embodiment.

Step (B)

The step (B) of the present invention is to cure at least a part of the transparent resin in the opening 2.

The process of curing the transparent resin is not limited in particular. The transparent resin may be cured by heat, light, or the combination of heat and light. In particular, a photosensitive resin used as a transparent resin is preferably light-cured. When the transparent resin is photo-curable, at least a part of the transparent resin in the opening 2 only has to be cured by pattern exposure. The exposure may be conducted from the transparent resin layer A side, from the transparent resin layer B side, or from the both transparent resin layer sides. In any of these cases, the transparent resin layer A and the transparent resin layer B can be cured in the opening at the same time.

When the transparent resin layer B is exposed from the transparent resin layer A side for light-curing, the cured parts of transparent resin 402 with an outline formed from an opening 2 and the uncured part of the transparent resin 401 on the substrate 1 can be formed by using the substrate 1 as the light shielding part (see FIG. 1(b)). Accordingly, the transparent resin layer B can be easily patterned by exposure and development (see FIG. 1(c)).

In this step (B), at least a part of the transparent resin layer A and at least a part of the transparent resin layer B provided on the both respective surfaces of the substrate 1 are preferably cured at the same time when at least a part of the transparent resin in the opening is cured from the viewpoint of the productivity.

Step (D)

The step (D) of the present invention is to form an optical waveguide including a clad layer and a core layer on at least any one of the transparent resin layers A and B.

This step may sequentially form a lower clad layer 6, a core layer 7, and an upper clad layer 8 on the transparent resin layer A or may previously produce an optical waveguide including a clad layer and a core layer and then attach this optical waveguide to the substrate 1.

The process of forming each of these layers sequentially is not limited in particular. A liquid resin composition for forming a clad layer or a liquid resin composition for forming a core layer may be applied by spin coating or the like. A film resin composition for forming a clad layer or a film resin composition for forming a core layer may be laminated by using a means such as a roll laminator, a vacuum laminator, a press, and a vacuum press.

In the embodiment shown in FIGS. 1(a) to 1(e), the transparent resin layer B is patterned by exposure and development. The transparent resin layer B can be cured without being patterned to obtain the optical waveguide shown in FIG. 9. In this case, the optical waveguide can be provided on the transparent resin layer B as well as on the transparent resin layer A.

In this embodiment, the transparent resin layer A and the lower clad layer 6 can be combined. In this case, the core layer 7 and the upper clad layer 8 only have to be sequentially formed on the transparent layer A by using the above-mentioned process. Moreover, in the present invention, the transparent resin layer A and the core layer 7 can be combined. In this case, the upper clad layer 8 only has to be formed on the transparent resin layer A.

Step (E)

The step (E) of the present invention is to form a mirror on the core layer.

As the process of forming a mirror 9, a well-known method can be applied. For example, the mirror can be formed by cutting the core layer 7 with a dicing saw or the like from the core layer 7 formed surface side. The mirror 9 to be formed has a degree of 45°.

Metal such as gold may be deposited on the mirror 9 with a deposition device to form a mirror provided with a specular metal layer. This step (E) may be conducted after a core layer is laminated during the above-mentioned step (D), specifically, between the process of forming a core layer and the process of forming an upper clad layer.

As long as having the structure to change the optical path after a light signal transmits through the core layer placed in parallel with the substrate plane to the vertical direction of the substrate, the mirror 9 is not limited in particular. The mirror may be an air reflection mirror formed from a notch inclined by 45° or may be a metal reflection mirror with a specular metal layer formed on the notch.

The members, the materials, and the like used in the method of producing the optical waveguide according to the third embodiment can be used in the method of producing the optical waveguide according to the first embodiment.

Electrical Wiring and Protective Layer for Electrical Wiring

In the optical waveguide produced by the method of the present invention, various optical devices are implemented on the surface opposite to the core formed surface. For example, the aspect of the optical waveguide may have an electrical wiring board provided with electrical wiring 10 as shown in FIG. 4. As long as being transparent to a light signal to be used, capable of forming a pattern by using active light, and usable as the protective layer for electrical wiring 11, the transparent resin layer B can be used as the protective layer for electrical wiring 11 to protect the above-mentioned electrical wiring 10. In this aspect, the transparent resin layer B and the protective layer for electrical wiring 11 are combined. For such an aspect, the process of patterning the transparent resin filled in the opening 2 and the process of patterning the protective layer for electrical wiring 11 may be conducted in the same process or the different processes.

Formation Step of a Protective Layer for Electrical Wiring

The process of patterning the transparent resin layer B as the protective layer for electrical wiring will be explained below.

When the transparent resin layer B is a photosensitive resin composition for protecting electrical wiring, and electrical wiring 10 is provided on the surface of the substrate on which the transparent resin layer B is formed, a protective layer for electrical wiring 11 formed from the cured part of transparent resin 402 can be formed by pattern exposure after the transparent resin layer B is formed. In this case, the pattern exposure of the transparent resin layer B in the opening 2 and the pattern exposure of the protective layer for electrical wiring 11 are conducted at the same time, the uncured part of the transparent resin part 401 is removed by etching, and the transparent resin layer B on the patterned opening and the protective layer for electrical wiring 11 are pattern-exposed, etched, and formed at the same time. When the transparent resin layer B in the opening 2 is pattern-exposed from the transparent resin layer A side, only the protective layer for electrical wiring 11 is pattern-exposed and etched after the transparent resin layer B is formed, to pattern the opening and the protective layer for electrical wiring 11.

Figure 10:
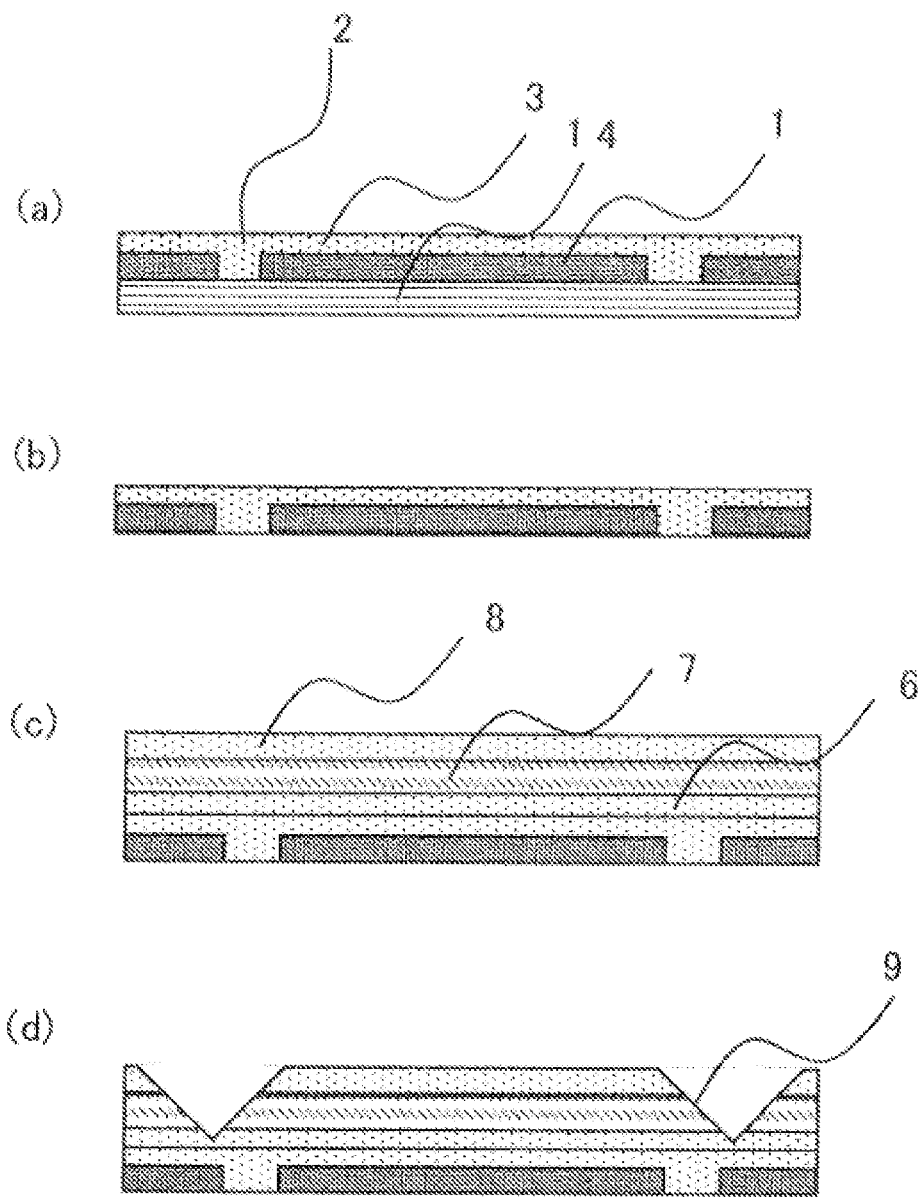
FIGS. 10(a) to 10(d) show the diagram illustrating one example of the method of producing an optical waveguide according to the present invention.
Figure 11:
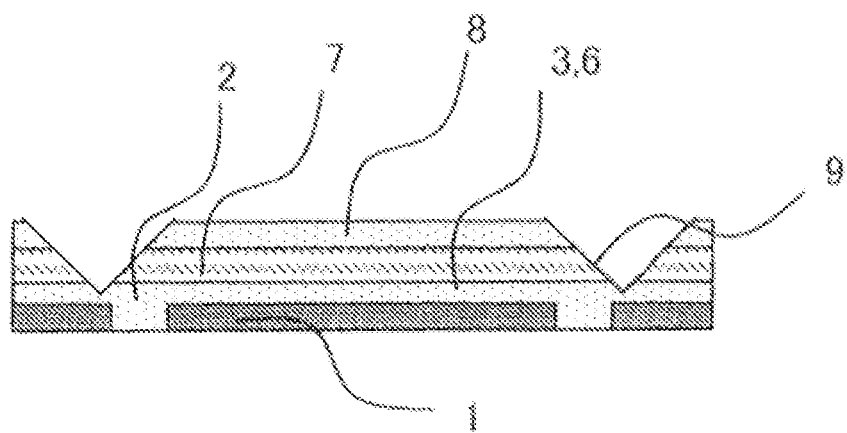
FIG. 11 shows the diagram illustrating one example of the optical waveguide obtained by the method of the present invention.
Figure 12:
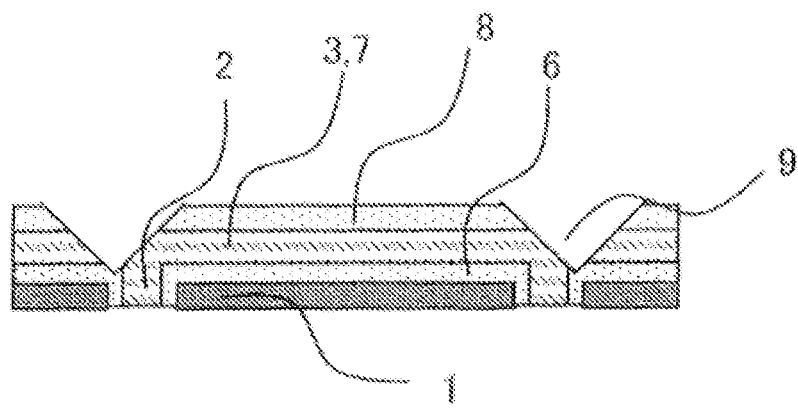
FIG. 12 shows the diagram illustrating one of other examples of the optical waveguide obtained by the method of the present invention.
Figure 13:
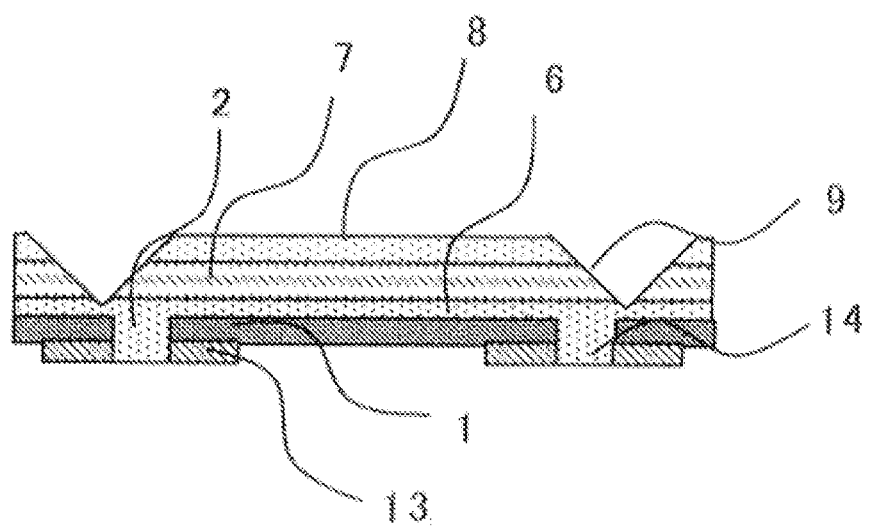
FIG. 13 shows the diagram illustrating one of other examples of the optical waveguide obtained by the method of the present invention.

Moreover, one embodiment of the optical waveguide of the present invention has no pillar-shaped transparent members 5 in contrast to the first embodiment. Specifically, in this embodiment of the optical waveguide with a mirror, the substrate 1 has at least one opening 2, a transparent resin layer 3 is formed on the one side of the substrate 1, the opening 2 is filled with a transparent resin, a lower clad layer 6, a core layer 7, and an upper clad layer 8 are sequentially formed on the transparent resin layer 3, a mirror 9 is provided immediately above the opening 2 as shown in FIG. 10(*d*) (hereinafter referred to as "fourth embodiment"). Moreover, in FIG. 10(*d*), an optical waveguide with a mirror in which the transparent resin layer 3 and the lower clad layer 6 are combined as shown in FIG. 11 and an optical waveguide with a mirror in which the lower clad layer 6 is used as a part of the transparent resin layer 3 (around the opening 2) and in which the core layer 7 is used as a part of the transparent resin layer 3 (in the center of the opening 2) as shown in FIG. 12 are of the present invention. Furthermore, as shown in FIG. 13, a reinforcing plate 13 may be provided around the opening 2 on the surface opposite to the transparent resin layer 3 formed surface.

In the optical waveguide according to the fourth embodiment, since a light signal transmits through the opening 2, excellent optical communication can be advantageously conducted regardless of the type (light signal transmission) of the substrate 1.

When having a high transparency, the substrate 1 typically has a higher refractive index than the transparent resin, the lower clad layer, and the core layer. Thus, Fresnel loss is caused by the refractive index difference between air and the substrate when a light signal transmits through the substrate. On the other hand, in the optical waveguide obtained by the method of the present invention, the opening 2 is filled with a transparent resin which has a lower refractive index than the substrate 1, light transmits through this transparent resin so as to decrease the Fresnel loss.

In the method of producing the optical waveguide according to the fourth embodiment, the transparent resin can be filled up to the height of the surface opposite to the transparent resin layer 3 surface of the substrate 1 because the opening 2 is filled with a transparent resin after the release layer 14 is provided as described later. Since the transparent resin can be filled up to the approximately same height as that of the surface of substrate 1, the flatness of the substrate is easily secured. Thus, the handling is facilitated when the optical waveguide with a mirror is inserted in a connector incorporating an optical device, when the optical waveguide with a mirror is mounted in a housing incorporating an optical device, and when wiring is formed or processed on the surface of the substrate 1.

Release Layer

The release layer 14 only has to be a material with removability from the transparent resin and flatness on the opening 2. For the release layer 14, materials listed as those usable for the above-mentioned substrate and various resin film materials can be used.

The material which is removable after the transparent resin layer 3 is formed (e.g., material to etch and remove the metal layer) also has removability in the wider sense.

The film material with flexibility and toughness as the release layer 14 can also be used. The examples of the material includes a polyester, such as polyethylene terephthalate, polybutylene terephthalate, or polyethylene naphthalate; or polyethylene, polypropylene, polyamide, polycarbonate, polyphenylene ether, polyether sulfide, polyarylate, a liquid crystalline polymer, polysulfone, polyethersulfone, polyether ether ketone, and polyether imide, polyamide-imide, and polyimide.

The thickness of the release layer 14 is preferably 5 to 10000 µm. The thickness of 5 µm or more has an advantage that strength as a release layer can be easily obtained. The thickness of 10000 µm or less makes the handling easier to laminate the transparent resin layer 3. From these viewpoints, the thickness of the release layer 14 more preferably falls within the range of 10 to 100 μm.

The method of producing the optical waveguide according to the fourth embodiment is composed of the following steps.

(A') A release layer is provided on one surface of the substrate having at least one opening while forming a transparent resin layer formed of a transparent resin on the other side and filling the opening with a transparent resin.

(A") The release layer is removed after the opening is filled with a transparent resin.

(D) An optical waveguide including a clad layer and a core layer is formed on the substrate.

(E) A mirror is formed on the core layer immediately above the opening.

Each step will be explained below in detail in reference to FIGS. 10(*a*) to 10(*d*).

Step (A')

The step (A') is to provide a release layer 14 on one surface of the substrate having at least one opening while forming a transparent resin layer 3 formed of a transparent resin on the other surface and filling the opening 2 with a transparent resin as shown in FIG. 10(*a*).

The process of laminating a transparent resin on the substrate 1 to form a transparent resin layer 3 and the process of filling the opening 2 with a transparent resin are not limited in particular. When being varnish, the transparent resin only has to be applied to the substrate 1 by a conventional method. When the transparent resin is in a film form, various means such as a roll laminator, a vacuum pressure laminator, a press, and a vacuum press only have to be used. In this case, a release layer 14 is provided on the surface opposite to the transparent resin layer 3 formed surface of the substrate 1. This reduces the transparent resin that has flowed in the opening 2 from its flowing around the opening, prevents the film thickness of the transparent resin layer 3 to be formed from decreasing due to the outflow of the resin, and suppresses the non-flatness.

The release layer 14 only has to have removability from (non-adhesiveness to) the substrate 1 and may have no adhesiveness (including re-attachability).

In the present invention, exposing a photo-curable transparent resin from the transparent resin layer 3 formed surface side by using the substrate 1 substituted for the light shield part can efficiently cure the inside of the opening 2. For example, even when the transparent resin exudes between the release layer 14 and the substrate 1, the exuded transparent resin can be removed by developing the surface opposite to the transparent resin layer 3 formed surface after the release layer 14 is removed. An optical waveguide including a clad layer and a core layer is formed on the thus obtained substrate 1, and a mirror 9 aligned with the opening 2 is formed on the core layer of the optical waveguide to obtain an optical waveguide with a mirror.

Step (A")

The step (A") of the present invention is to remove the release layer 14 after the opening 2 is filled with a transparent resin (see FIG. 10(*b*)).

The process of removing the release layer 14 is not limited in particular. The release layer only has to be physically peeled off. When formed of a material capable of being etched, the release layer 14 only has to be removed with a liquid capable of etching. The release layer only has to be removed after the opening 2 is filled with a transparent resin (after the transparent resin layer 3 is formed). The release layer may be removed before or after the transparent resin filled in the opening 2 is light-cured. When the transparent resin filled in the opening 2 is light-cured, the transparent resin layer 3 formed of a transparent resin is typically light-cured at the same time.

Step (B)

The present invention may have a step of light-curing the above-mentioned transparent resin, specifically, the step (step (B)) of light-curing at least the transparent resin filled in the opening 2 from the transparent resin layer formed 3 surface side after the step (A').

The process of curing the transparent resin is not limited in particular. Active light to light-cure the transparent resin only has to be delivered from the transparent resin layer formed 3 surface side. Using the substrate 1 as the light shield part can efficiently cure the inside of the opening 2.

Step (G)

The step (G) is an optional step to develop the surface opposite to the transparent resin layer formed surface after the above-mentioned step (A"). When the adhesiveness between the release layer 14 and the substrate 1 is absent or weak in the step (A'), the transparent resin filled in the opening 2 may flow in between the release layer 14 and the substrate 1. The step (G) is to remove this flowed component. The step (G) is preferably conducted so as to remove contamination due to the transparent resin on the surface of the substrate other than the opening, which opposite to the transparent resin layer formed surface. Examples of the process of removing such flowed component include a process of removing the transparent resin by using a developer capable of developing and removing the transparent resin after the step of removing a release layer as the step (A").

Step (D)

The step (D) of the present invention is to form an optical waveguide including a clad layer and a core layer on the substrate 1.

The process of forming an optical waveguide on the substrate 1 is not limited in particular. An optical waveguide including a lower clad layer 6, a core layer 7, and an upper clad layer 8 may be previously produced and then attached to the substrate 1. The lower clad layer 6, the core layer 7, and the upper clad layer 8 may be sequentially formed on the substrate 1.

The step (D) may be to sequentially form a lower clad layer 6, a core layer 7, and an upper clad layer 8 on the transparent resin layer 3. The step (D) is applicable when the adhesion between the lower clad layer 6 and the transparent resin layer 3 is present. The step (D) is preferable because the adhesion between the substrate and the lower clad layer 6 may not be considered.

The process of forming each of these layers when sequentially forming the lower clad layer 6, the core layer 7, and the upper clad layer 8 is not limited in particular. A liquid resin composition for forming a clad layer or a liquid resin composition for forming a core layer may be applied by spin coating or the like. A film resin composition for forming a clad layer or a film resin composition for forming a core layer may be laminated by using a means such as a roll laminator, a vacuum laminator, a press, and a vacuum press.

In the present invention, the transparent resin layer 3 may be the lower clad layer 6. In other words, the transparent resin layer 3 and the lower clad layer 6 can be combined. In this case, the core layer 7 and the upper clad layer 8 only have to be sequentially formed on the transparent layer 3 by using the above-mentioned process (see FIG. 11).

In the present invention, the transparent resin layer 3 may also be the core layer 7. In other words, the transparent resin layer 3 and the core layer 7 can be combined (see FIG. 12). In this case, the upper clad layer 8 only has to be formed on the transparent resin layer 3.

Step (E)

The step (E) of the present invention is to forma mirror 9 on the core layer 7 immediately above the opening 2.

As the process of forming a mirror 9, a well-known method can be applied. For example, the mirror can be formed by cutting the core layer 7 with a dicing saw or the like from the core layer 7 formed surface side. The mirror 9 to be formed has a degree of 45°.

Metal such as gold may be deposited on the mirror 9 with a deposition device to forma mirror provided with a specular metal layer. This step (E) may be conducted after a core layer is laminated during the above-mentioned step (D), specifically, between the process of forming a core layer and the process of forming an upper clad layer.

As long as having the structure to change the optical path after a light signal transmits through the core layer placed in parallel with the substrate plane to the vertical direction of the substrate, the mirror 9 is not limited in particular. The mirror may be an air reflection mirror formed from a notch inclined by 45° or may be a metal reflection mirror with a specular metal layer formed on the notch.

The part "immediately above the opening 2" shows the positional and dimensional relationship between the size and the position of the opening and the mirror not to produce a negative effect caused by interfering in a light signal passing through the opening so as not to cause optical transmission loss. This light signal has an optical path changed from the core pattern to the vertical direction of the substrate by the mirror or from the vertical direction of the substrate to the core pattern by the mirror.

The same members, the materials, and the like used in the method of producing the optical waveguide according to the first embodiment can be used in the method of producing the optical waveguide according to the fourth embodiment.

EXAMPLES

The present invention will be explained in reference to the examples in detail below but is not limited to the following examples without departing the scope of the invention.

Example 1

Preparation of Resin Film for Forming a Clad Layer

Preparation of Base Polymer (A): (Meth)Acrylic Polymer (A-1)

46 parts by mass of propylene glycol monomethyl ether acetate and 23 parts by mass of methyl lactate were weighed and placed in a flask equipped with an agitator, a condenser, a gas introduction tube, a dropping funnel and a thermometer, and stirred with nitrogen gas introduced therein. The liquid temperature was increased to 65° C. Subsequently, a mixture of 47 parts by mass of methyl methacrylate, 33 parts by mass of butyl acrylate, 16 parts by mass of 2-hydroxyethyl methacrylate, 14 parts by mass of methacrylic acid, 3 parts by mass of 2,2'-azobis(2,4-dimethylvaleronitrile), 46 parts by mass of propylene glycol monomethyl ether acetate and 23 parts by mass of methyl lactate was added dropwise for 3 hours and stirred at 65° C. for 3 hours, then at 95° C. for 1 hour to obtain the (meth)acrylic polymer (A-1) solution (solid content: 45 mass %).

Measurement of Weight Average Molecular Weight

The weight average molecular weight (standard polystyrene conversion) of the polymer (A-1) measured with a GPC instrument ("SD-8022," "DP-8020," and "RI-8020" available from Tosoh Corporation) was $3.9 \times 10^4$. The columns used were "Gelpack GL-A150-S" and "Gelpack GL-A160-S" available from Hitachi Chemical Co., Ltd.

Measurement of Acid Value

The acid value of the polymer (A-1) measured was 79 mgKOH/g. The acid value was calculated from the amount of a 0.1 mol/L potassium hydroxide aqueous solution that was required for neutralizing the polymer (A-1) solution. The point where phenolphthalein added as an indicator was changed from colorless to pink color was designated as the neutralization point.

Preparation of Resin Varnish for Forming a Clad Layer 84 parts by mass (solid content: 38 parts by mass) of the polymer (A-1) solution (solid content: 45 mass %) as the base polymer (A); 33 parts by mass of urethane (meth)acrylate having a polyester skeleton ("U-200AX" available from Shin-Nakamura Chemical Co., Ltd.) and 15 parts by mass of urethane (meth)acrylate having a polypropylene glycol skeleton ("UA-4200" available from Shin-Nakamura Chemical Co., Ltd.) as the photo-curable component (B); 20 parts by mass (solid content: 15 parts by mass) of polyfunctional blocked isocyanate solution formed by protecting an isocyanurate trimer of hexamethylene diisocyanate with methyl ethyl ketone oxime (solid content: 75 mass %) ("Sumidur BL3175" available from Sumika Bayer Urethane Co., Ltd.) as the thermosetting component (C); 1 part by mass of 1-[4-(2-hydroxyethoxy)phenyl]-2-hydroxy-2-methyl-1-propan-1-one ("Irgacure 2959" available from BASF Japan Co., Ltd.) and 1 part by mass of bis(2,4,6-trimethylbenzoyl)phenylphosphine oxide ("Irgacure 819" available from BASF Japan Co., Ltd.) as the photopolymerization initiator (D); and 23 parts by mass of propylene glycol monomethyl ether acetate as an organic solvent for dilution were mixed while being stirred. The mixture was filtered under increased pressure with a Polyflon filter with a pore diameter of 2 μm ("PF020" available from Advantec Toyo Co., Ltd.) and then defoamed under reduced pressure to obtain a resin varnish for forming a clad layer.

The resin composition varnish for forming a clad layer obtained as described above was applied on the non-treated surface of a PET film ("COSMOSHINE A4100" available from Toyobo Co., Ltd., thickness: 50 μm) as a carrier film with a coating machine (Multicoater TM-MC, available from Hirano Tecseed Co., Ltd.) and then dried at 100° C. for 20 minutes. Subsequently, a surface-release PET film ("Purex A31" available from Teijin DuPont Films Japan Ltd., thickness: 25 μm) as a protective film was laminated to obtain a resin film for forming a clad layer.

The thickness of the resin layer may be arbitrarily adjusted by changing the gap of the coating machine. The thickness of the lower clad layer 6, the transparent resin layer 3, and the transparent resin layer 4 used in Examples will be described in the respective Examples. The film thicknesses after cured and after coated of the lower clad layer 6, the transparent resin layer 3, and the transparent resin layer 4 were not changed. The thickness of the resin film for forming an upper clad layer used in Examples will be described in respective Examples. The thickness of the resin film for forming an upper clad layer described in each Example is measured after the coating.

Preparation of Resin Film for Forming a Core Layer

The resin varnish B for forming a core layer was prepared in the same way and under the same conditions as the above-mentioned preparation example except that 26 parts by mass of phenoxy resin (product name: PHENOTOHTO YP-70, available from Tohto Kasei Co., Ltd) was used as the base polymer (A), 36 parts by mass of 9,9-bis[4-(2-acryloyloxyethoxy)phenyl]fluorene (product name: A-BPEF, available from Shin-Nakamura Chemical Co., Ltd.) and 36 parts by mass of bisphenol A epoxy acrylate (product name: EA-1020, available from Shin-Nakamura Chemical Co., Ltd.) were used as the photopolymerizable compound (B), 1 part by mass of bis(2,4,6-trimethylbenzoyl)phenylphosphine oxide (product name: Irgacure 819, available from BASF Japan) and 1 part by mass of 1-[4-(2-hydroxyethoxy)phenyl]-2-hydroxy-2-methyl-1-propane-1-one (product name: Irgacure 2959, available from BASF Japan) were used as the photopolymerization initiator (C), and 40 parts by mass of propylene glycol monomethyl ether acetate was used as an organic solvent. The resulting varnish B was filtered under increased pressure and then defoamed under reduced pressure in the same way and under the same conditions as the above-mentioned preparation example.

The resulting resin varnish B for forming a core layer was applied to an untreated surface of a PET film (product name: COSMOSHINE A1517, available from Toyobo Co., Ltd., thickness: 16 μm) as a carrier film and then dried in the same way as the above-mentioned preparation example. Subsequently, a surface-release PET film (product name: Purex A31, available from Teijin DuPont Films, thickness: 25 μm) as a protective film was laminated so that the releasing surface is attached to the resin side to obtain a resin film for forming a core layer. The thickness of the resin layer may be arbitrarily adjusted by changing the gap of the coating machine. The thicknesses of the resin film for forming a core layer used in Examples will be described in respective Examples. The thickness of the resin film for forming a core layer described in each Example is measured after the coating.

Preparation of Substrate with Openings

Two openings with a diameter of 150 μm were formed on a polyimide film (polyimide; UPILEX RN available from Ube-Nitto Kasei Co., Ltd.) with a size of 150 mm×150 mm and a thickness of 25 μm as the substrate 1 by using a drill (distance between respective centers of openings: 100 mm) to obtain a substrate 1 with openings 2.

Formation of Pillar-Shaped Transparent Members

The resin films for forming a clad layer with a thickness of 25 μm obtained as described above as the transparent resin layer A and the transparent resin layer B after the respective protective films were removed were thermally compression-bonded and laminated to the both surfaces of the substrate 1 with openings 2 obtained as described above under conditions of a pressure of 0.4 MPa, a temperature of 110° C., and a pressure time of 30 seconds after vacuumized to 500 Pa or less with a vacuum pressure laminator ("MVLP-500" available from Meiki Co., Ltd.) (see FIG. 1(a)).

Then, the laminated body was irradiated with ultraviolet rays (wavelength: 365 nm) from the transparent resin layer 3 side through the carrier film at a light intensity of 300 mJ/cm$^2$ with an ultraviolet exposure machine ("EXM-1172" available from Oke factory Ltd.) to form a cured part of transparent resin 402 and an uncured part of transparent resin 401. At this time, the transparent resin layer A was light-cured. Subsequently, the respective career films of the both surfaces were removed, and the uncured part of transparent resin 401 were etched by using a developer (1% of potassium carbonate aqueous solution), washed with water, dried and cured by heating at 170° C. for 1 hour to form pillar-shaped transparent members 5 (see FIG. 1(b)).

The resin film for forming a clad layer with a thickness of 15 μm obtained as described above as the lower clad 6 after the protective film was removed was thermally compression-bonded and laminated to the transparent resin layer 3 obtained as described above under conditions of a pressure of 0.4 MPa, a temperature of 110° C., and a pressure time of 30 seconds after vacuumized to 500 Pa or less with a vacuum pressure laminator ("MVLP-500" available from Meiki Co., Ltd.). Then, the laminated body was irradiated with ultraviolet rays (wavelength: 365 nm) from the carrier film side of the lower clad layer 6 at a light intensity of 3.0 J/cm$^2$ with the above-mentioned ultraviolet exposure machine. After the carrier film was removed, the laminated body was dried and cured by heating at 170° C. for 1 hour to form a lower clad layer 6.

After the protective film was removed, the resin film for forming a core layer with a thickness of 50 μm obtained as described above as the core layer 7 was laminated to the lower clad layer 6 formed as described above with a roll laminator ("HLM-1500" available from Hitachi Chemical Techno-Plant Co., Ltd.) under conditions of a pressure of 0.4 MPa, a temperature of 50° C., and a lamination speed of 0.2 m/min and then thermally compression-bonded under conditions of a pressure of 0.4 MPa, a temperature of 70° C., and a pressure time of 30 seconds after vacuumized to 500 Pa or less with a vacuum pressure laminator ("MVLP-500" available from Meiki Co., Ltd.).

Subsequently, the negative photomask having openings and a core pattern width of 50 μm is aligned to form a core pattern on the openings. Then, ultraviolet rays (wavelength: 365 nm) were delivered from the carrier film side at a light intensity of 0.8 J/cm$^2$ and followed by post-exposure heat treatment at 80° C. for 5 minutes. Subsequently, the PET film as a carrier film were removed, and then a core pattern was etched with a developer (propylene glycol monomethyl ether acetate/N,N-dimethyl acetoamide=8/2 in mass ratio). Then, the laminated body was washed with a rinse solution (isopropanol) and dried by heating at 100° C. for 10 minutes to form a core pattern.

The resin film for forming a clad layer with a thickness of 55 μm obtained as described above as the upper clad layer 8 after the protective film was removed was thermally compression-bonded and laminated to the obtained core pattern under conditions of a pressure of 0.4 MPa, a temperature of 110° C., and a pressure time of 30 seconds after vacuumized to 500 Pa or less with a vacuum pressure laminator ("MVLP-500" available from Meiki Co., Ltd.). Then, the laminated body was irradiated with ultraviolet rays (wavelength: 365 nm) from the carrier film side of the upper clad layer 8 at alight intensity of 3.0 J/cm$^2$ with the above-mentioned ultraviolet exposure machine. After the carrier film was removed, the laminated body was dried and cured by heating at 170° C. for 1 hour to form an optical waveguide (see FIG. 1(d)).

Formation of Mirror

A dicing saw ("DAC552" available from Disco Corporation) was cut into the upper clad layer 8 of the obtained optical waveguide to form a mirror 9 with a degree of 45° immediately above the openings 2 (see FIG. 1(e)). As a result, an optical waveguide with a mirror, which has pillar-shaped transparent members 5 projecting 25 μm from the surface of the substrate 1, was obtained.

Measurement of Optical Transmission Loss of Mirror

When a light signal with a wave length of 850 nm were entered by using an optical fiber A (GI50, NA-0.2) from a mirror of the optical waveguide, and then the light signal that transmitted through the core pattern and exited from another mirror were received by using an optical fiber B (GI50, NA-0.2), the optical transmission loss (A) was measured. At this time, the distance from the surface of the substrate 1 to both the optical fiber A and the optical fiber B was 30 μm (distance between pillar-shaped transparent members 5 and both optical fibers A and B: 5 μm). Subsequently, the two mirrors were cut by using the above-mentioned dicing saw to obtain an optical waveguide with no mirrors. Then, the above-mentioned optical fiber A is aligned on the input part side in the coaxial direction with the core pattern while the above-mentioned optical fiber B is aligned on the output part side to measure the optical transmission loss (B).

The total optical transmission loss (C) of the two mirrors was calculated according to the following expression.

$$(C)=(A)-(B)$$

The total optical transmission loss of the two mirrors of the obtained optical waveguide was 2.10 dB.

Example 2

Except for using a transparent resin layer 3 with a thickness of 25 μm as the lower clad layer 6, an optical waveguide with a mirror was prepared in the same manner as Example 1 (see FIG. 2).

The total optical transmission loss of the two mirrors of the obtained optical waveguide was 2.00 dB.

Example 3

In Example 2, the resin film for forming a clad layer with a thickness of 15 μm was used as the transparent resin layer 4. Ultraviolet rays (wavelength: 365 nm) were delivered at a light intensity of 0.3 J/cm² through the negative photomask with the respective centers of the openings (80 μm) as the light shielding parts to expose the transparent resin layer 3 combined with the lower clad layer 6 and the transparent resin layer 4. After the respective centers of the openings were etched, the laminated body was washed with water, irradiated with ultraviolet rays at a light intensity of 3.0 J/cm² from the lower clad layer 6 side with the above-mentioned exposure machine, and dried and cured by heating at 170° C. for 1 hour.

Then, a resin film for forming a core layer from which the protective film was removed was laminated to the lower clad layer. A resin film for forming a core layer with a thickness of 25 μm which is the same as that described above was laminated to the back surface of the substrate 1 as the transparent resin layer 4 after the protective film was removed. Subsequently, the negative photomask with two openings with a diameter of 200 μm and an opening with a width of 50 μm that connects those two openings was placed so that the openings with a diameter of 200 μm are aligned with the openings on the substrate 1. Then, ultraviolet rays (wavelength: 365 nm) were delivered from the carrier film side at a light intensity of 0.8 J/cm² and followed by post-exposure heat treatment at 80° C. for 5 minutes. Subsequently, the PET film as a carrier film were removed, and then a core pattern was etched with a developer (propylene glycol monomethyl ether acetate/N,N-dimethyl acetoamide=8/2 in mass ratio). Then, the laminated body was washed with a rinse solution (isopropanol) and dried by heating at 100° C. for 10 minutes to form a core pattern.

The following processes were conducted in the same manner as Example 2 to obtain an optical waveguide with a mirror (see FIG. 3).

The total optical transmission loss of the two mirrors of the obtained optical waveguide was 1.90 dB.

Example 4

An optical waveguide with a mirror was prepared in the same manner as Example 2 except for using a substrate 1 having electrical wiring on the back surface, delivering ultraviolet rays (wavelength: 365 nm) from the transparent resin layer B side at a light intensity of 0.3 J/cm² through a negative photomask having the pattern of a protective layer for electrical wiring after exposing the transparent resin layer B to pattern-expose the transparent resin layer B again (see FIG. 4).

The total optical transmission loss of the two mirrors of the obtained optical waveguide was 2.10 dB.

Comparative Example 1

Except for not forming the openings 2 on the substrate 1 or the transparent resin layer 4, an optical waveguide with a mirror was prepared in the same manner as Example 1.

The total optical transmission loss of the two mirrors of the obtained optical waveguide was 2.89 dB. At this time, the distance from both the optical fiber A and the optical fiber B to the surface of the substrate 1 was 30 μm.

Comparative Example 2

Except for not forming the openings 2 on the substrate 1 or the transparent resin layer 4, an optical waveguide with a mirror was prepared in the same manner as Example 2.

The total optical transmission loss of the two mirrors of the obtained optical waveguide was 2.85 dB. At this time, the distance from both the optical fiber A and the optical fiber B to the surface of the substrate 1 was 30 μm.

Example 5

Except replacing the substrate with openings with a substrate with a reinforcing plate and openings produced by the method described below, an optical waveguide with a mirror was obtained in the same manner as Example 1. Specifically, the optical waveguide with a mirror was prepared in the following method.

Preparation of Substrate with Reinforcing Plate and Openings

Two openings with a diameter of 150 μm were formed on a polyimide film with copper foil on the one side (polyimide; UPILEX VT available from Ube-Nitto Kasei Co., Ltd., thickness: 25 μm, copper foil: 12.5 μm) with a size of 150 mm×150 mm as the substrate 1 by using a drill (distance between respective centers of openings: 100 mm) to obtain a substrate 1 with openings 2.

Then, a photosensitive dry film resist (product name: "PHOTEK" available from Hitachi Chemical Co., LTD., thickness: 25 μm) was attached to the copper foil surface with a roll laminator (HLM-1500 available from Hitachi Chemical Technoplant Co., Ltd.) under conditions of a pressure of 0.4 MPa, a temperature of 110° C., and a lamination speed of 0.4 m/min. The laminated body was irradiated with ultraviolet rays (wavelength: 365 nm) from the photosensitive dry film resist side at a light intensity of 120 mJ/cm² through a negative photomask having openings with a diameter of 200 µm, the centers of which are the same as those of the corresponding openings 2, by using an ultraviolet ray exposing machine ("EXM-1172" available from Oke factory Ltd.). The unexposed part of the photosensitive dry film resist was removed with a dilute solution of 5% by mass of sodium carbonate which has a temperature of 35° C. Then, the copper foil of the part from which the photosensitivity dry film resist was removed was removed by using ferric chloride solution. The photosensitivity dry film resist of the exposed part was removed by using 10% by mass of sodium hydroxide solution which has a temperature of 35° C. to form a reinforcing plate 12 (see FIG. 5 (*a*)).

Figure 5:
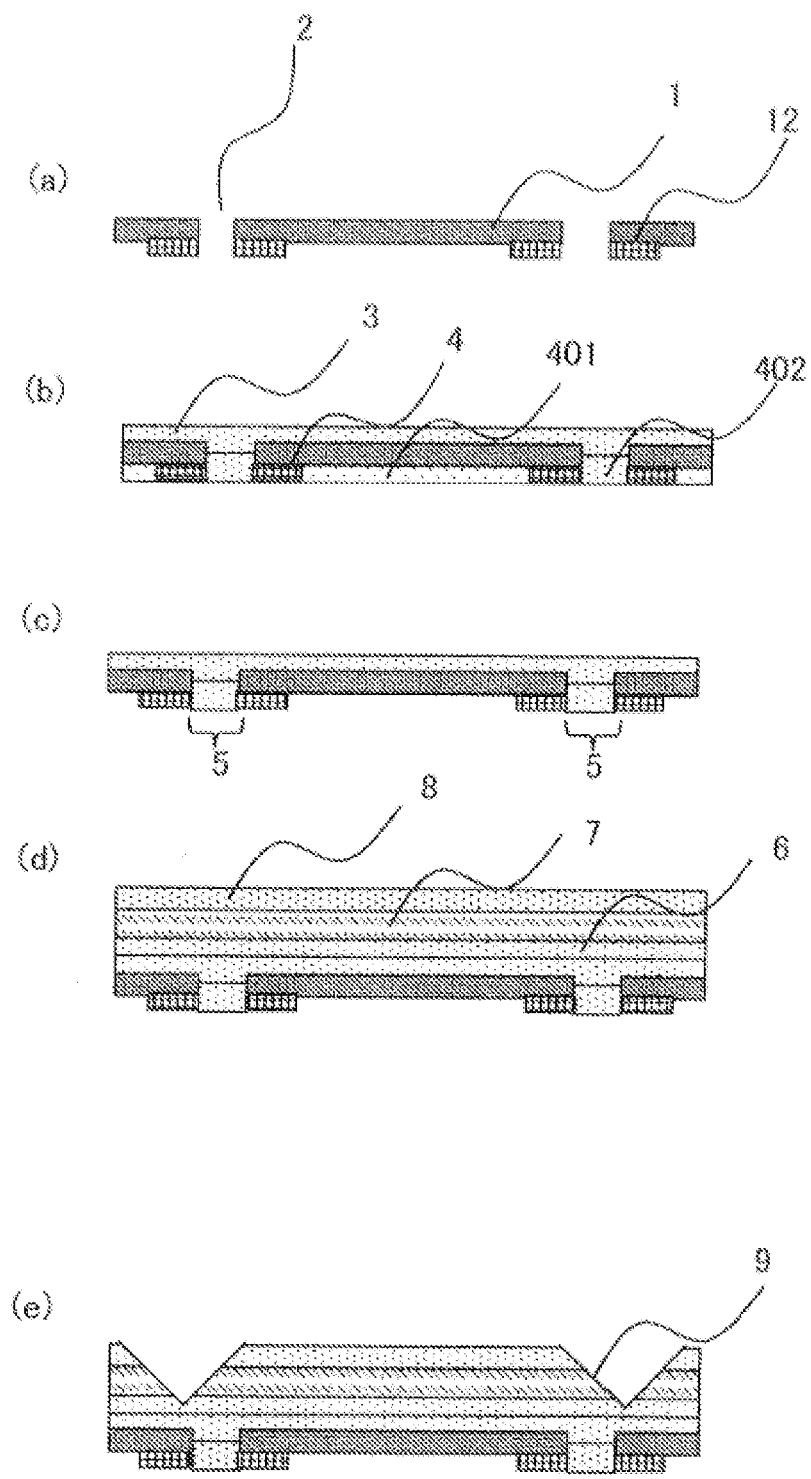
FIGS. 5(a) to 5(e) show the diagram illustrating one example of the method of producing an optical waveguide according to the present invention.

In the same manner as Example 1, a cured part of transparent resin 402 and an uncured part of transparent resin 401 (see FIG. 5 (*b*)), pillar-shaped transparent members 5 (see FIG. 5 (*c*)), and an optical waveguide (see FIG. 5 (*d*)) were formed, mirrors with a degree of 45° were formed immediately above the openings 2 (see FIG. 5(*e*)). As a result, an optical waveguide with a mirror, which has pillar-shaped transparent members 5 projecting 25 µm from the surface of the substrate 1, was obtained.

The total optical transmission loss of the two mirrors of the obtained optical waveguide was 2.10 dB.

Example 6

Figure 6:
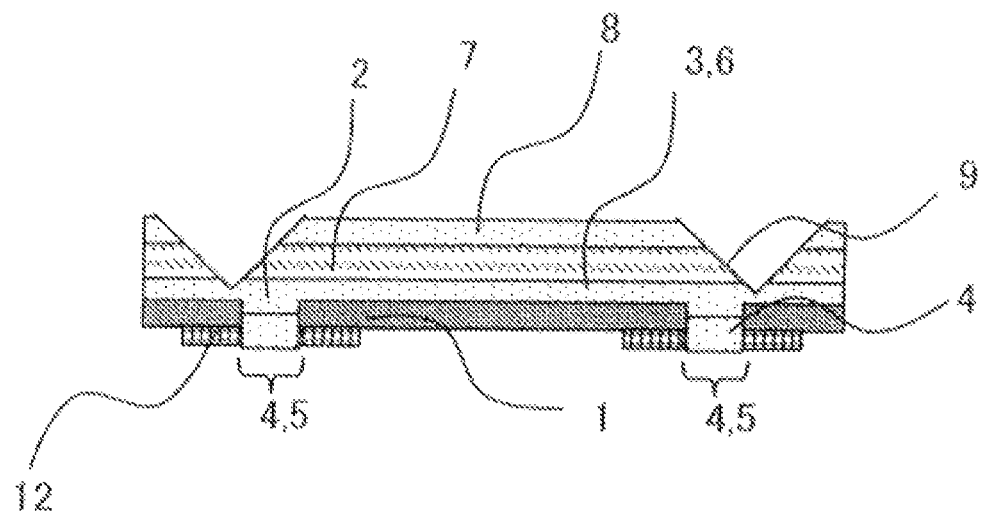
FIG. 6 shows the diagram illustrating one example of the optical waveguide of the present invention.

Except for using a transparent resin layer 3 with a thickness of 25 µm as the lower clad layer 6, an optical waveguide with a mirror was prepared in the same manner as Example 5 (see FIG. 6).

The total optical transmission loss of the two mirrors of the obtained optical waveguide was 2.00 dB.

Example 7

In Example 6, the resin film for forming a clad layer with a thickness of 24 µm was used as the transparent resin layer 4. Ultraviolet rays (wavelength: 365 nm) were delivered at a light intensity of 0.3 J/cm² through the negative photomask with the respective centers of the openings (80 µm) as the light shielding parts to expose the transparent resin layer 3 combined with the lower clad layer 6 and the transparent resin layer 4. After the respective centers of the openings were etched, the laminated body was washed with water, irradiated with ultraviolet rays at a light intensity of 3.0 J/cm² from the lower clad layer 6 side with the above-mentioned exposure machine, and dried and cured by heating at 170° C. for 1 hour.

Then, a resin film for forming a core layer from which the protective film was removed was laminated to the lower clad layer. A resin film for forming a core layer with a thickness of 25 µm which is the same as that described above was laminated to the back surface of the substrate 1 as the transparent resin layer 4 after the protective film was removed. Subsequently, the negative photomask with two openings with a diameter of 200 µm and an opening with a width of 50 µm that connects those two openings was placed so that the openings with a diameter of 200 µm are aligned with the openings 2 on the substrate 1. Then, ultraviolet rays (wavelength: 365 nm) were delivered from the carrier film side at a light intensity of 0.8 J/cm² and followed by post-exposure heat treatment at 80° C. for 5 minutes. Subsequently, the PET film as a carrier film were removed, and then a core pattern was etched with a developer (propylene glycol monomethyl ether acetate/N,N-dimethyl acetoamide=8/2 in mass ratio). Then, the laminated body was washed with a rinse solution (isopropanol) and dried by heating at 100° C. for 10 minutes to form a core pattern.

Figure 7:
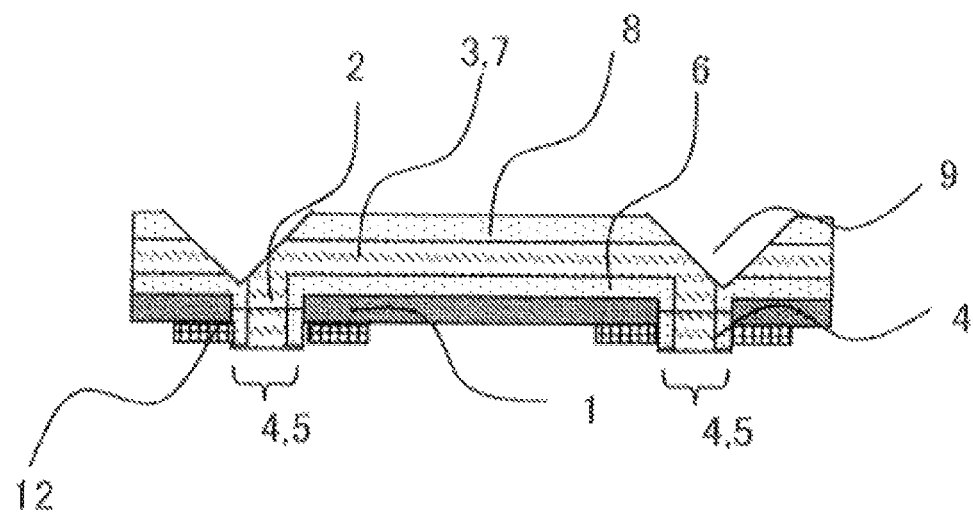
FIG. 7 shows the diagram illustrating one of other examples of the optical waveguide of the present invention.

The following processes were conducted in the same manner as Example 6 to obtain an optical waveguide with a mirror (see FIG. 7).

The total optical transmission loss of the two mirrors of the obtained optical waveguide was 1.90 dB.

Example 8

Figure 8:
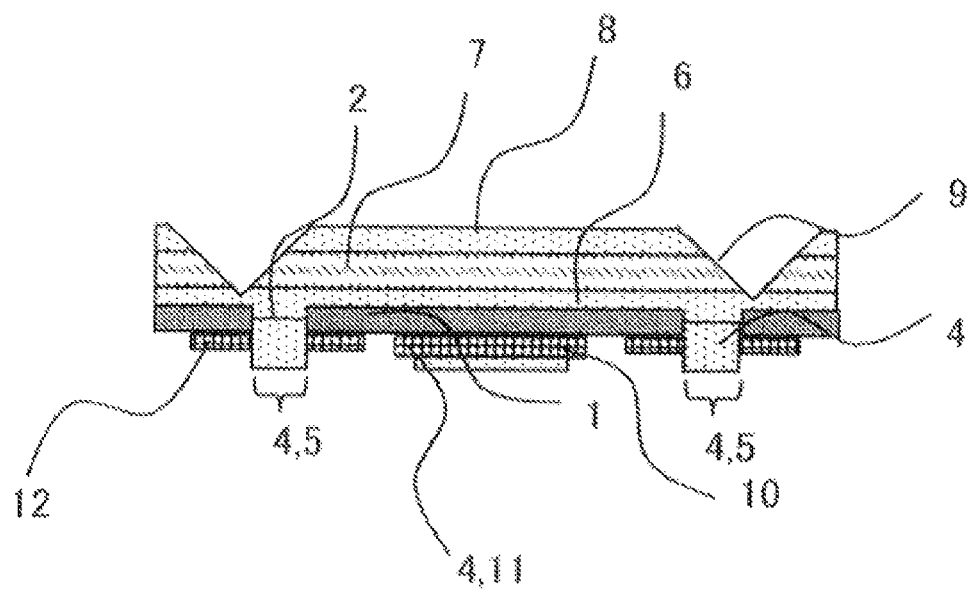
FIG. 8 shows the diagram illustrating one of other examples of the optical waveguide of the present invention.

An optical waveguide with a mirror was prepared in the same manner as Example 6 except for forming an reinforcing plate 12 and electrical wiring 10 on the back surface of the substrate 1, delivering ultraviolet rays (wavelength: 365 nm) from the transparent resin layer B side at a light intensity of 0.3 J/cm² through a negative photomask having the pattern of a protective layer for electrical wiring after exposing the transparent resin layer B to pattern-expose the transparent resin layer B again (see FIG. 8).

The total optical transmission loss of the two mirrors of the obtained optical waveguide was 2.11 dB.

Example 9

Except for setting the thickness of the copper foil to 25 µm, the thickness of the transparent resin layer 4 to 50 µm, and the diameter of the openings 2 to 75 µm, an optical waveguide with a mirror was prepared in the same manner as Example 6.

The total optical transmission loss of the two mirrors of the obtained optical waveguide was measured. At this time, the distance from the surface of the substrate 1 to both the optical fiber A and the optical fiber B was 55 µm (distance between pillar-shaped transparent members 5 and both optical fibers A and B: 5 µm). The total optical transmission loss of the two mirrors of the obtained optical waveguide was 2.22 dB.

Comparative Example 3

Except for not forming the openings 2 on the substrate 1 or the transparent resin layer 4, an optical waveguide with a mirror was prepared in the same manner as Example 5. The total optical transmission loss of the two mirrors of the obtained optical waveguide was 2.89 dB. At this time, the distance from both the optical fiber A and the optical fiber B to the surface of the substrate 1 was 30 µm.

Comparative Example 4

Except for not forming the openings 2 on the substrate 1 or the transparent resin layer 4, an optical waveguide with a mirror was prepared in the same manner as Example 6. The total optical transmission loss of the two mirrors of the obtained optical waveguide was 2.85 dB. At this time, the distance from both the optical fiber A and the optical fiber B to the surface of the substrate 1 was 30 µm.

Example 10

Except for using a resin film for forming a clad layer with a thickness of 10 µm as the transparent resin layer A and using a resin film for forming a clad layer with a thickness of 25 µm as the transparent resin layer B, an optical waveguide with a mirror having transparent members 5 projecting 25 µm from the surface of the substrate 1 was obtained in the same manner as Example 1.

As a result of measuring the obtained optical transmission loss in the same manner as Example 1, the total optical transmission loss of the two mirrors of the obtained optical waveguide was 2.10 dB.

Example 11

An optical waveguide with a mirror was formed in the same manner as Example 2 except for irradiating both the transparent resin layer A and the transparent resin layer B with ultraviolet rays (wavelength: 365 nm) at a light intensity of 3.0 J/cm$^2$ with the above-mentioned ultraviolet exposure machine, removing the carrier film, and then curing the laminated body at 170° C. for 1 hour (see FIG. 9).

The total optical transmission loss of the two mirrors of the obtained optical waveguide was 2.11 dB.

Comparative Example 5

Except for not forming the openings 2 on the substrate 1, an optical waveguide with a mirror was prepared in the same manner as Example 2. (The transparent resin layer B on the openings 2 was pattern-formed.) The transparent resin layer B was peeled off while the transparent resin layer B was etched.

Example 12

An optical waveguide with a mirror, which has openings filled with resin, was formed as described below in place of the process of forming pillar-shaped transparent members in Example 1.
Filling Resin in Openings A surface-release PET film (product name: Purex A31, available from Teijin DuPont Films, thickness: 25 μm) with a size of 150 mm×150 mm as the release layer 14 was placed on the surface opposite to the transparent resin layer 3 formed surface of the substrate 1 so that the releasing surface is attached to the substrate 1. The resin film for forming a clad layer with a thickness of 25 μm obtained as described above as the transparent resin layer 3 after the protective film was removed was thermally compression-bonded and laminated to the substrate 1 with openings 2 obtained as described above under conditions of a pressure of 0.4 MPa, a temperature of 110° C., and a pressure time of 30 seconds after vacuumized to 500 Pa or less with a vacuum pressure laminator ("MVLP-500" available from Meiki Co., Ltd.) (see FIG. 10(a)).

Then, the laminated body was irradiated with ultraviolet rays (wavelength: 365 nm) from the transparent resin layer 3 side through the carrier film at a light intensity of 300 mJ/cm$^2$ with an ultraviolet exposure machine ("EXM-1172" available from Oke factory Ltd.). Subsequently, the carrier film of the transparent resin layer 3 and the release layer 14 were removed. Resin flowed in between the release layer 14 on the surface opposite to the transparent resin layer 3 formed surface and the substrate 1 was developed and removed with a developer (1% of potassium carbonate aqueous solution). Then, the laminated body was washed with water, dried and cured by heating at 170° C. for 1 hour to form a substrate 1 having openings 2 filled with the transparent resin 3 (see FIG. 10 (b)).

The resin film for forming a clad layer with a thickness of 10 μm as the lower clad layer 6 after the protective film was removed was thermally compression-bonded and laminated to the transparent resin layer 3 obtained as described above under conditions of a pressure of 0.4 MPa, a temperature of 110° C., and a pressure time of 30 seconds after vacuumized to 500 Pa or less with a vacuum pressure laminator ("MVLP-500" available from Meiki Co., Ltd.). Then, the laminated body was irradiated with ultraviolet rays (wavelength: 365 nm) from the carrier film side of the lower clad layer 6 at a light intensity of 3.0 J/cm$^2$ with the above-mentioned ultraviolet exposure machine.

After the carrier film was removed, the laminated body was dried and cured by heating at 170° C. for 1 hour to form a lower clad layer 6.

After the protective film was removed, the resin film for forming a core layer with a thickness of 50 μm obtained as described above as the core layer 7 was laminated to the lower clad layer 6 with a roll laminator ("HLM-1500" available from Hitachi Chemical Techno-Plant Co., Ltd.) under conditions of a pressure of 0.4 MPa, a temperature of 50° C., and a lamination speed of 0.2 m/min and thermally compression-bonded under conditions of a pressure of 0.4 MPa, a temperature of 70° C., and a pressure time of 30 seconds after vacuumized to 500 Pa or less with a vacuum pressure laminator ("MVLP-500" available from Meiki Co., Ltd.).

Subsequently, the negative photomask having openings and a core pattern width of 50 μm is aligned to forma core pattern on the openings. Then, ultraviolet rays (wavelength: 365 nm) were delivered from the carrier film side at a light intensity of 0.8 J/cm$^2$ and followed by post-exposure heat treatment at 80° C. for 5 minutes. Subsequently, the PET film as a carrier film were removed, and then a core pattern was etched with a developer (propylene glycol monomethyl ether acetate/N,N-dimethyl acetoamide=8/2 in mass ratio). Then, the laminated body was washed with a rinse solution (isopropanol) and dried by heating at 100° C. for 10 minutes to form a core pattern.

The resin film for forming a clad layer with a thickness of 55 μm obtained as described above as the lower clad layer 6 after the protective film was removed was thermally compression-bonded and laminated to the obtained core pattern under conditions of a pressure of 0.4 MPa, a temperature of 110° C., and a pressure time of 30 seconds after vacuumized to 500 Pa or less with a vacuum pressure laminator ("MVLP-500" available from Meiki Co., Ltd.). Then, the laminated body was irradiated with ultraviolet rays (wavelength: 365 nm) from the carrier film side of the lower clad layer 6 at a light intensity of 3.0 J/cm$^2$ with the above-mentioned ultraviolet exposure machine. After the carrier film was removed, the laminated body was dried and cured by heating at 170° C. for 1 hour to form an optical waveguide (see FIG. 10(c)).
Formation of Mirror A dicing saw ("DAC552" available from Disco Corporation) was cut into the upper clad layer 8 side of the obtained optical waveguide to form a mirror a degree of 45° on the openings 2 (see FIG. 10(d)).

As a result of measuring the obtained optical transmission loss in the same manner as Example 1, the total optical transmission loss of the two mirrors of the obtained optical waveguide was 1.98 dB.

Example 13

Except for using a transparent resin layer 3 with a thickness of 25 μm as the lower clad layer 6, an optical waveguide with a mirror was prepared in the same manner as Example 12 (see FIG. 11).

The total optical transmission loss of the two mirrors of the obtained optical waveguide was 1.92 dB.

Example 14

In Example 13, ultraviolet rays (wavelength: 365 nm) were delivered at a light intensity of 0.3 J/cm$^2$ through the negative photomask with the respective centers of the openings (80 μm) as the light shielding parts to expose the transparent resin layer 3. Subsequently, the carrier film of the transparent resin layer 3 and the release layer 14 were removed. After the respective centers of the openings were developed and removed, the laminated body was washed with water, irradiated with ultraviolet rays at a light intensity of 3.0 J/cm$^2$ from the lower clad layer 6 side with the above-mentioned exposure machine, and dried and cured by heating at 170° C. for 1 hour. Then, a surface-release PET film (product name: Purex A31, available from Teijin DuPont Films, thickness: 25 μm) with a size of 150 mm×150 mm as the release layer 14 was placed on the surface of the substrate 1 so that the releasing surface is attached to the substrate 1 (the surface opposite to the lower clad layer 6 side). Then, a resin film for forming a core layer with a thickness of 50 μm from which the protective film was removed was laminated as the core layer 7 to the transparent resin layer 3 side of the substrate 1. Subsequently, the negative photomask with two openings with a diameter of 200 μm and an opening with a width of 50 μm that connects those two openings was placed so that the openings with a diameter of 200 μm are aligned with the openings on the substrate 1. Then, ultraviolet rays (wavelength: 365 nm) were delivered from the carrier film side at a light intensity of 0.8 J/cm$^2$ and followed by post-exposure heat treatment at 80° C. for 5 minutes. Subsequently, the PET film as a carrier film were removed, and then a core pattern was etched with a developer (propylene glycol monomethyl ether acetate/N, N-dimethyl acetoamide=8/2 in mass ratio). Then, the laminated body was washed with a rinse solution (isopropanol) and dried by heating at 100° C. for 10 minutes to form a core pattern.

The following processes were conducted in the same manner as Example 13 to obtain an optical waveguide with a mirror (see FIG. 12).

The total optical transmission loss of the two mirrors of the obtained optical waveguide was 1.90 dB.

Example 15

Two openings with a diameter of 150 μm were formed on a polyimide film with copper foil on the one side (polyimide; UPILEX RN available from Ube-Nitto Kasei Co., Ltd., thickness: 25 μm copper foil: 12.5 μm) with a size of 150 mm×150 mm as the substrate 1 by using a drill (distance between respective centers of openings: 100 mm) to obtain a substrate 1 with openings 2.

Then, a photosensitive dry film resist (product name: "PHOTEK" available from Hitachi Chemical Co., LTD., thickness: 25 μm) was attached to the copper foil surface with a roll laminator (HLM-1500 available from Hitachi Chemical Technoplant Co., Ltd.) under conditions of a pressure of 0.4 MPa, a temperature of 110° C., and a lamination speed of 0.4 m/min. Then, the laminated body was irradiated with ultraviolet rays (wavelength: 365 nm) from the photosensitive dry film resist side at a light intensity of 120 mJ/cm$^2$ through a negative photomask having openings with a diameter of 200 μm, the centers of which are the same as those of the corresponding openings 2, by using an ultraviolet ray exposing machine ("EXM-1172" available from Oke factory Ltd.). The unexposed part of the photosensitive dry film resist was removed with a dilute solution of 5% by mass of sodium carbonate which has a temperature of 35° C. Then, the copper foil of the part from which the photosensitivity dry film resist was removed was removed by using ferric chloride solution. The photosensitivity dry film resist of the exposed part was removed by using 10% by mass of sodium hydroxide solution which has a temperature of 35° C. to forma reinforcing plate 13. The following processes were conducted in the same manner as Example 13 to obtain an optical waveguide with a mirror (see FIG. 13).

The total optical transmission loss of the two mirrors of the obtained optical waveguide was 2.00 dB.

Comparative Example 6

Except for not forming the openings 2 on the substrate 1, an optical waveguide with a mirror was prepared in the same manner as Example 12.

The total optical transmission loss of the two mirrors of the obtained optical waveguide was 2.55 dB.

Comparative Example 7

Except for not forming the openings 2 on the substrate 1, an optical waveguide with a mirror was prepared in the same manner as Example 13.

The total optical transmission loss of the two mirrors of the obtained optical waveguide was 2.45 dB.

INDUSTRIAL APPLICABILITY

The optical waveguide of the present invention is capable of transmitting a light signal regardless of the type of the substrate. Since the space gap between an optical device and the optical waveguide substrate is small, the optical waveguide of the present invention is capable of suppressing the spread of a light signal reflected from the mirror and allowing a light signal to transmit with a low optical transmission loss. Therefore, the optical waveguide of the present invention is applicable to a wide range of areas of various optical devices, optical interconnections, and the like.

The invention claimed is:

1. A method of producing an optical waveguide comprising: a lower clad layer, a core layer, an upper clad layer, a substrate, and a mirror, the lower clad layer, the core layer, and the upper clad layer being sequentially laminated to the substrate, the mirror being formed on the core layer, wherein the substrate has an opening, the maximum diameter of the opening is larger than that of luminous flux reflected by the mirror, and the maximum diameter of the opening is 240 μm or less, and a pillar-shaped transparent member projecting from the opening beyond the back surface direction of the substrate, the method comprising: a step (A) of laminating a transparent resin layer A formed of a transparent resin a to one surface of a substrate having an opening and filling at least a part of the opening on the substrate with a transparent resin a while laminating a transparent resin layer B formed of a transparent resin b to the back surface of the substrate; a step (B) of exposing the opening from the transparent resin layer A formed surface side to light-cure the transparent resin b on and in the opening; and a step (C) of developing and removing the transparent resin layer B as the uncured part after the step (B) to form a pillar-shaped transparent member.

2. The method according to claim 1, further comprising: a step ($D_1$) of forming a lower clad layer, a core layer, and an upper clad layer on the transparent resin layer A; and a step (E) of forming a mirror on the core layer, after the step (B) or the step (C).

3. The method according to claim 2, in which the transparent resin b is a photosensitive resin composition for protecting electrical wiring, and the substrate has electrical wiring on the surface of the substrate on which the transparent resin layer B is formed, the method further comprising a step (F) of pattern-exposing the transparent resin b after the step (A) or the step (B) to form a protective layer for electrical wiring for protecting wiring.

4. The method according to claim 1, in which the transparent resin a is a resin composition for forming a lower clad layer, the method further comprising: a step ($D_2$) of forming a core layer and an upper clad layer on the formed lower clad layer; and a step (E) of forming a mirror on the core layer, after the step (B) or the step (C).

5. The method according to claim 4, in which the transparent resin b is a photosensitive resin composition for protecting electrical wiring, and the substrate has electrical wiring on the surface of the substrate on which the transparent resin layer B is formed, the method further comprising a step (F) of pattern-exposing the transparent resin b after the step (A) or the step (B) to form a protective layer for electrical wiring for protecting wiring.

6. A method of producing an optical waveguide comprising: a lower clad layer, a core layer, an upper clad layer, a substrate, and a mirror, the lower clad layer, the core layer, and the upper clad layer being sequentially laminated to the substrate, the mirror being formed on the core layer, wherein the substrate has an opening, the maximum diameter of the opening is larger than that of luminous flux reflected by the mirror, and the maximum diameter of the opening is 240 μm or less, a pillar-shaped transparent member projecting from the opening beyond the back surface direction of the substrate and a reinforcing plate connected with at least a part of the sidewall of the pillar-shaped transparent member, the method comprising: a step (S) of forming a reinforcing plate around the opening on the back surface of the substrate; a step (A) of laminating a transparent resin layer A formed of a transparent resin a to the surface of the substrate and laminating a transparent resin layer B formed of a transparent resin b to the back surface of the substrate; a step (B) of exposing the opening from the transparent resin layer A formed surface side to light-cure the transparent resin b on and in the opening; and a step (C) of developing and removing the transparent resin layer B as the uncured part after the step (B) to form a pillar-shaped transparent member.

7. The method according to claim 6, wherein the step (S) is a step ($S_1$) of forming an opening by a hole process after patterning the reinforcing plate or a step ($S_2$) of patterning the reinforcing plate after forming an opening on the reinforcing plate by a hole process.

8. A method of producing an optical waveguide comprising: a lower clad layer, a core layer, an upper clad layer, a substrate, and a mirror, the lower clad layer, the core layer, and the upper clad layer being sequentially laminated to the substrate, the mirror being formed on the core layer, wherein the substrate has an opening, the maximum diameter of the opening is larger than that of luminous flux reflected by the mirror, and the maximum diameter of the opening is 240 μm or less, and a pillar-shaped transparent member projecting from the opening beyond the back surface direction of the substrate, the method comprising: a step (A) of forming a lower clad layer on one surface of the substrate so that the state in which at least a part of an opening on a substrate is opened on the substrate is maintained and then laminating a resin composition for forming a core layer to the lower clad layer and filling at least a part of the opening on the substrate with a resin composition for forming a core layer while laminating a transparent resin b to the other surface of the substrate; a step (B) of exposing the opening from the core layer side to light-cure the transparent resin b in and on the opening; a step (C) of developing and removing the uncured part of the transparent resin b to form a pillar-shaped transparent member; a step ($D_3$) of forming an upper clad layer on the core layer; and a step (E) of forming a mirror on the core layer.

9. A method of producing an optical waveguide comprising: a lower clad layer, a core layer, an upper clad layer, a substrate, and a mirror, the lower clad layer, the core layer, and the upper clad layer being sequentially laminated to the substrate, the mirror being formed on the core layer, wherein the substrate has an opening, the maximum diameter of the opening is larger than that of luminous flux reflected by the mirror, and the maximum diameter of the opening is 240 μm or less, a pillar-shaped transparent member projecting from the opening beyond the back surface direction of the substrate and a reinforcing plate connected with at least a part of the sidewall of the pillar-shaped transparent member, the method comprising: a step (S) of forming a reinforcing plate around the opening on the back surface of the substrate; a step (A) of forming a lower clad layer on the surface of the substrate so that the state in which at least a part of an opening on a substrate is opened is maintained and then laminating a resin composition for forming a core layer to the lower clad layer and filling at least a part of the opening on the substrate with a resin composition for forming a core layer while laminating a transparent resin b to the back surface of the substrate; a step (B) of exposing the opening from the core layer side to light-cure the transparent resin b in and on the opening; a step (C) of developing and removing the uncured part of the transparent resin b to form a pillar-shaped transparent member; a step ($D_3$) of forming an upper clad layer on the core layer; and a step (E) of forming a mirror on the core layer.

10. A method of producing an optical waveguide comprising: a lower clad layer, a core layer, an upper clad layer, a substrate, and a mirror, the lower clad layer, the core layer, and the upper clad layer being sequentially laminated to the substrate, the mirror being formed on the core layer, wherein the substrate has an opening, the maximum diameter of the opening is larger than that of luminous flux reflected by the mirror, and the maximum diameter of the opening is 240 μm or less, and a pillar-shaped transparent member projecting from the opening beyond the back surface direction of the substrate, the method comprising a step (A) of forming a transparent resin layers A and B by using a transparent resin on the both surfaces of the substrate having at least one opening and filling the opening with the transparent resin; a step (B) of curing at least a part of the transparent resin in the opening; a step (D) of forming an optical waveguide including a clad layer and a core layer on the surface of at least one of the transparent resin layers A and B; and a step (E) of forming a mirror on the core layer, wherein the transparent resin layers A and B on the respective surfaces of the substrate are formed at the same time in the step (A).

11. The method according to claim 10, wherein at least a part of the transparent resin in the opening and at least a part of the transparent resin layer A and at least a part of the transparent resin layer B formed on the both respective surfaces of the substrate are cured in the step (B).

12. The method according to claim 10, wherein the transparent resin is a photosensitive transparent resin, and at least one of the transparent resin layers A and B are patterned by exposure and development in the step (B).

13. The method according to claim 10, wherein the step (D) is a step of sequentially forming a lower clad layer, a core layer, and an upper clad layer.

14. The method according to claim 10, wherein at least one of the clad layer and the core layer is formed of the transparent resin.

15. The method according to claim 10, wherein a mirror is formed immediately above the opening in the step (E).

16. The method according to claim 10, wherein the substrate is an electrical wiring board, and the transparent resin is a protective layer for electrical wiring for protecting electrical wiring to protect the electrical wiring in the step (A).

17. A method of producing an optical waveguide comprising a lower clad layer, a core layer, an upper clad layer, a substrate, and a mirror, the lower clad layer, the core layer, and the upper clad layer being sequentially laminated to the substrate, the mirror being formed on the core layer, wherein the substrate has an opening, the maximum diameter of the opening is larger than that of luminous flux reflected by the mirror, and the maximum diameter of the opening is 240 μm or less, and a transparent resin layer A formed of a transparent resin a between the substrate and the lower clad layer, wherein the opening is filled with the transparent resin a, the method comprising a step (A') of providing a release layer on one surface of the substrate having at least one opening while forming a transparent resin layer formed of a transparent resin on the other surface and filling the opening with a transparent resin; a step (A") of removing the release layer after the opening is filled with a transparent resin; a step (D) of forming an optical waveguide including a clad layer and a core layer on the substrate; and a step (E) of forming a mirror on the core layer immediately above the opening.

18. The method according to claim 17, wherein the step (D) is a step of sequentially forming a lower clad layer, a core layer, and an upper clad layer on the substrate.

19. The method according to claim 17, wherein the step (D) is a step of sequentially forming a lower clad layer, a core layer, and an upper clad layer on the transparent resin layer.

20. The method according to claim 17, wherein the transparent resin layer is a lower clad layer or a core layer.

21. The method according to claim 17, in which the transparent resin is a photosensitive transparent resin, the method further comprising a step (C) of light-curing the transparent resin filled in at least the opening from the transparent resin layer side after the step (A').

22. The method according to claim 21, further comprising a step (G) of developing the surface opposite to the transparent resin layer formed surface after the step (A").

* * * * *